United States Patent
Otsuki et al.

(10) Patent No.: US 9,003,482 B2
(45) Date of Patent: Apr. 7, 2015

(54) RECEIVING DEVICE, TRANSMITTING DEVICE, BROADCASTING SYSTEM, RECEIVING METHOD, AND NON-TRANSITORY COMPUTER-READABLE RECORDING MEDIUM

(75) Inventors: Kazuhiro Otsuki, Tokyo (JP); Hisayuki Ohmata, Kawasaki (JP); Keigo Majima, Kawasaki (JP); Arisa Fujii, Tokyo (JP); Tomoyuki Inoue, Kawasaki (JP)

(73) Assignee: Nippon Hoso Kyokai, Tokyo (JP)

( * ) Notice: Subject to any disclaimer, the term of this patent is extended or adjusted under 35 U.S.C. 154(b) by 16 days.

(21) Appl. No.: 13/981,155

(22) PCT Filed: Jan. 31, 2012

(86) PCT No.: PCT/JP2012/052051
§ 371 (c)(1), (2), (4) Date: Jul. 23, 2013

(87) PCT Pub. No.: WO2012/105523
PCT Pub. Date: Aug. 9, 2012

(65) Prior Publication Data
US 2013/0312059 A1    Nov. 21, 2013

(30) Foreign Application Priority Data

Jan. 31, 2011 (JP) ................... 2011-018262
May 20, 2011 (JP) ................... 2011-112981

(51) Int. Cl.
*H04L 29/06* (2006.01)
*H04H 60/13* (2008.01)
(Continued)

(52) U.S. Cl.
CPC ............... *H04L 63/20* (2013.01); *H04H 60/13* (2013.01); *H04N 21/8173* (2013.01);
(Continued)

(58) Field of Classification Search
CPC ....... H04H 60/13; H04H 60/14; H04H 60/15; H04N 21/8133; H04N 21/4542; G06F 21/554; G06F 2221/2141; H04L 63/20
USPC .......................................................... 726/1
See application file for complete search history.

(56) References Cited

U.S. PATENT DOCUMENTS

2008/0207182 A1* 8/2008 Maharajh et al. .......... 455/414.1
2009/0183251 A1* 7/2009 Deinlein et al. ................ 726/12
(Continued)

FOREIGN PATENT DOCUMENTS

EP         0957606 A2    11/1999
EP         1511297 A2     3/2005
(Continued)

OTHER PUBLICATIONS

ARIB Standard, "Application Execution Engine Platform for Digital Broad Casting," ARIB STD-B23 Version 1.1, Association of Radio Industries and Businesses, Feb. 5, 2004, pp. 1-323.
(Continued)

*Primary Examiner* — Kambiz Zand
*Assistant Examiner* — Tongoc Tran
(74) *Attorney, Agent, or Firm* — Drinker Biddle & Reath LLP

(57) ABSTRACT

A receiving device includes: an output unit configured to output content broadcast from a transmitting device; an application execution unit configured to execute an application; a security policy acquiring unit configured to acquire security policy level data sent from the transmitting device with respect to the application, the security policy level data indicating a sorted level of the application; a policy level acquiring unit configured to acquire policy level data sent from the transmitting device with respect to currently broadcast content, the policy level data indicating a sorted level of the currently broadcast content; a determining unit configured to determine whether or not the application is an application to be controlled, based on the policy level data acquired by the policy level acquiring unit and the security policy data of the application acquired by the security policy acquiring unit; and an application control unit configured to instruct the application execution unit to control the application determined to be the application to be controlled.

7 Claims, 21 Drawing Sheets

(51) Int. Cl.
| | |
|---|---|
| *H04N 21/81* | (2011.01) |
| *H04H 60/14* | (2008.01) |
| *H04N 21/454* | (2011.01) |
| *H04N 21/8355* | (2011.01) |
| *G06F 21/55* | (2013.01) |
| *G06F 21/62* | (2013.01) |
| *H04H 60/15* | (2008.01) |
| *H04H 60/16* | (2008.01) |

(52) U.S. Cl.
CPC .......... *H04H 60/14* (2013.01); *H04N 21/8133* (2013.01); *H04N 21/4542* (2013.01); *H04N 21/8355* (2013.01); *G06F 21/554* (2013.01); *G06F 21/629* (2013.01); *H04H 60/15* (2013.01); *H04H 60/16* (2013.01); *G06F 2221/2101* (2013.01); *G06F 2221/2141* (2013.01)

(56) References Cited

U.S. PATENT DOCUMENTS

| | | | |
|---|---|---|---|
| 2011/0151871 A1* | 6/2011 | Naqvi et al. ............... | 455/435.1 |
| 2011/0225417 A1* | 9/2011 | Maharajh et al. ............. | 713/150 |
| 2012/0137319 A1* | 5/2012 | Schooling et al. ............. | 725/16 |

FOREIGN PATENT DOCUMENTS

| | | |
|---|---|---|
| JP | 2002-305695 A | 10/2002 |
| JP | 2010-004498 A | 1/2010 |
| JP | 2010-166335 A | 7/2010 |
| JP | 2010-245868 A | 10/2010 |
| WO | WO 2007-094637 A1 | 8/2007 |

OTHER PUBLICATIONS

ETSI TS 102 809 v1.1.1 (Jan. 2010) "Digital Video Broadcasting (DVB); Signalling and carriage of interactive applications and services in Hybrid broadcast/broadband environments," ETSI, pp. 1-98.
International Search Report with a mailing date of Mar. 6, 2012 in PCT/JP2012/052051 filed Jan. 31, 2012.

* cited by examiner

FIG. 2

```
ait_identifier_info()

ait_identifier_info() {
  for(i=0;i<N;i++) {
    application_type    16    uimsbf
    policy_level         3    bslbf    ←NEWLY DEFINED (VALUE OF POLICY LEVEL)
    AIT_version_number   5    uimsbf
  }
   }
```

FIG. 3

```
security_policy_descriptor() {
  descriptor_tag          8    uimsbf
  descriptor_length       8    uimsbf
  policy_level            3    bslbf
  reserved_future_use     5    bslbf
}
```

FIG. 4

| APPLICATION ID | CONTROL CODE | PRIORITY |
|---|---|---|
|  |  |  |
|  |  |  |
| : | : | : |

FIG. 7

| EVENT ID | PROGRAM POLICY LEVEL | START APPLICATION ID |
|---|---|---|
|  |  |  |
|  |  |  |
| : | : | : |

FIG. 8

```
content_descriptor() {
   descriptor_tag           8    uimsbf
   descriptor_length        8    uimsbf
   for(i=0; i<N; i++) {
      content_nibble_level_1    4    uimsbf
      content_nibble_level_2    4    uimsbf
      user_nibble               4    uimsbf ←NEWLY DEFINED (VALUE OF POLICY LEVEL)
      user_nibble               4    uimsbf
   }
}
```

FIG. 9

```
arib_j_info() {
   transmission_format              2       bslbf
   reserved_future_use              1       bslbf
   document_resolution              4       bslbf
   default_version_flag             1       bslbf
   independent_flag                 1       bslbf
   application_identifier_flag      1       bslbf
   content_id_flag                  1       bslbf
   associated_application_flag      1       bslbf
   reserved_future_use              3       bslbf
   update_flag                      1       bslbf
   ISO_639_language_code            24      bslbf
   if(application_identifier_flag==1) {
      application_identifier()              bslbf   ←APPLICATION ID
   }
   if(content_id_flag==1) {
      content_id                    32      uimsbf
      content_version               16      uimsbf
   }
   if(default_version_flag==0) {
      application_profiles_length   8       uimsbf
      for(i=0;I<N;i++) {
         application_profile        16      uimsbf
         profile_major_version      8       uimsbf
         profile_minor_version      8       uimsbf
         profile_micro_version      8       uimsbf
      }
   }
   if(transmission_format=='00') {
      arib_carousel_info()
      ondemand_retrieval_flag       1       bslbf
      file_storable_flag            1       bslbf
      reserved_future_use           6       bslbf
   } else if(transmission_format=='01') {
      arib_stored_carousel_info()
   } else if(transmission_format=='10') {
      arib_object_carousel_info()
      ondemand_retrieval_flag       1       bslbf
      file_storable_flag            1       bslbf
      reserved_future_use           6       bslbf
   }
}
```

FIG. 10

```
event_schedule_security_descriptor () {
    descriptor_tag                  8       uimsbf
    descriptor_length               8       uimsbf
    event_policy_level              8       uimsbf
    for (i=0; i<n; i++) {
        application_identifier()            bslbf
        application_control_code    8       uimsbf
        associated_application_flag 1       bslbf
        reserved_future_use         7       bslbf
    }
}
```

FIG. 13

```
program_policy_descriptor () {
   descriptor_tag              8    uimsbf
   descriptor_length           8    uimsbf
   policy_level                3    bslbf
   reserved_future_use         5    bslbf
}
```

FIG. 14

| APPLICATION ID | CONTROL CODE | PRIORITY | PROTOCOL IDENTIFIER | PROGRAM RELATED FLAG |
|---|---|---|---|---|
|  |  |  |  |  |
|  |  |  |  |  |
| : | : | : | : | : |

FIG. 15

```
event_security_descriptor () {
   descriptor_tag              8    uimsbf
   descriptor_length           8    uimsbf
   event_policy_level          8    uimsbf
   for (i=0; i<n; i++) {
      application_identifier()      bslbf
      application_control_code  8   uimsbf
      application_priority      8   uimsbf
      protocol_id              16   uimsbf
      associated_application_flag 1 bslbf
      reserved_future_use       7   bslbf
   }
}
```

FIG. 18A

```
<xsd:simpleType name="ApplicationControlCode">
  <xsd:restriction base="xsd:string">
    <xsd:enumeration value="AUTOSTART"/>
    <xsd:enumeration value="PRESENT"/>
    <xsd:enumeration value="DESTROY"/>
    <xsd:enumeration value="KILL"/>
    <xsd:enumeration value="PREFETCH"/>
    <xsd:enumeration value="REMOTE"/>
    <xsd:enumeration value="DISABLED"/>
    <xsd:enumeration value="PLAYBACK_AUTOSTART"/>
  </xsd:restriction>
</xsd:simpleType>
```

FIG. 18B

```
<xsd:complexType name="ApplicationDescriptor">
  <xsd:sequence>
    <xsd:element name="type" type="mhp:ApplicationType"/>
    <xsd:element name="controlCode" type="mhp:ApplicationControlCode"/>
    <xsd:element name="visibility" type="mhp:VisibilityDescriptor" minOccurs="0"/>
    <xsd:element name="serviceBound" type="xsd:boolean" default="true" minOccurs="0"/>
    <xsd:element name="priority" type="ipi:Hexadecimal8bit"/>
    <xsd:element name="version" type="ipi:Version"/>
    <xsd:element name="mhpVersion" type="mhp:MhpVersion" minOccurs="0"/>
    <xsd:element name="icon" type="mhp:IconDescriptor" minOccurs="0"/>
    <xsd:element name="storageCapabilities" type="mhp:StorageCapabilities" minOccurs="0"/>
  </xsd:sequence>
</xsd:complexType>
```

FIG. 24

```
event_security_descriptor(){                              uimsbf
   descriptor_tag                              8          uimsbf
   descriptor_length                           8          uimsbf
   policy_level                                8          uimsbf
   for ( i=0; i<n; i++) {
      application_identifier()                            bslbf
      application_control_code                 8          uimsbf
      application_priority                     8          uimsbf
      protocol_id                              16         uimsbf
      associated_application_flag              1          bslbf
      reserved_future_use                      7          bslbf
      location_length
      for (j=0; j< location_length; j++){
         location_byte                         8          uimsbf
      }
      parameter_length
      for (k=0; k< parameter_length; k++){
         parameter_byte                        8          uimsbf
      }
   }
}
```

FIG. 25

```
event_security_descriptor(){                              uimsbf
   descriptor_tag                              8          uimsbf
   descriptor_length                           8          uimsbf
   policy_level                                8          uimsbf
   for ( i=0; i<n; i++) {
      application_identifier()                            bslbf
      application_control_code                 8          uimsbf
      application_priority                     8          uimsbf
      protocol_id                              16         uimsbf
      associated_application_flag              1          bslbf
      reserved_future_use                      7          bslbf
      application_descriptors_loop_length      12         uimsbf
      for (j=0; j<M; ;j++) {
         descriptor()
      }
   }
}
```

FIG. 26A

```
event_security_descriptor(){            uimsbf
    descriptor_tag          8           uimsbf
    descriptor_length       8           uimsbf
    policy_level            8           uimsbf
}
```

FIG. 26B

```
for ( i=0; i<n; i++) {
    application_identifier()                bslbf
    application_control_code    8           uimsbf
    application_priority        8           uimsbf
    protocol_id                 16          uimsbf
    associated_application_flag 1           bslbf
    reserved_future_use         7           bslbf
    location_length
    for (j=0; j<location_length; j++){
        location_byte           8           uimsbf
    }
    parameter_length
    for (k=0; k<parameter_length; k++){
        parameter_byte          8           uimsbf
    }
}
```

RECEIVING DEVICE, TRANSMITTING DEVICE, BROADCASTING SYSTEM, RECEIVING METHOD, AND NON-TRANSITORY COMPUTER-READABLE RECORDING MEDIUM

TECHNICAL FIELD

The present invention relates to a receiving device, a transmitting device, a broadcasting system, a receiving method, and a non-transitory computer-readable recording medium.

Priority is claimed on Japanese Patent Application No. 2011-18262 filed Jan. 31, 2011, and Japanese Patent Application No. 2011-112981 filed May 20, 2011, the content of which is incorporated herein by reference.

BACKGROUND ART

ARIB (association of radio industries and broadcast) STD-B23 has standardized application execution environments for digital broadcast. The standardization of application execution environments includes standardization of transmission of application information and the like. Additionally, ETSI (European telecommunications standards institute) TS 102 809 "Digital Video Broadcasting (DVB); Signaling and carriage of interactive applications and services in Hybrid broadcast/broadband environments" has defined XML (extensible markup language)-encoding of application information tables.

On the other hand, Patent Document 1 discloses technology that enables an organization side to perform a display control on a display device that displays images of content that is a program or an application program. Additionally, Patent Document 2 discloses technology that enables a boot control of applications by specifying time in various manners in broadcast application boot systems.

CITATION LIST

Patent Document

[Patent Document 1] Japanese Patent Unexamined Application, First Publication No. 2010-4498
[Patent Document 2] Japanese Patent Unexamined Application, First Publication No. 2010-166335

DISCLOSURE OF INVENTION

Problems to be Solved by the Invention

Regarding cooperative communication/broadcasting hybrid services, a broadcast receiving device simultaneously displays content that is broadcast and content acquired by an application via the Internet. For such hybrid services, it has been required to control applications installed in a receiving device as intended by a broadcasting organization. Further, at this time, it has also been required to control applications in consideration of the intent of the broadcasting organization that varies for each program and the intent of a communication content provider. However, the currently-standardized standards can define a life cycle for each application, but has not defined a real-time control of only an application among applications installed in a receiving device, which is within the scope arbitrarily defined by the broadcasting organization side at different times.

An object of the aforementioned Patent Document 1 is to control windows for programs and applications, and the broadcasting organization side performs a display control on the receiving device, but does not perform a control, such as a boot or quit of an application installed in a receiver, in accordance with a broadcast program. Additionally, Patent Document 2 discloses technology of previously specifying time and the like of an application to be provided by broadcasting, thereby causing a receiving device to boot the application. However, it is impossible to perform a control, such as a boot or quit of an application to be provided, by means other than broadcasting.

The present invention has been made in view of the above situations and provides a receiving device, a transmitting device, a broadcasting system and a program, which enables a broadcasting organization to control, in accordance with content on the air, applications installed in a broadcast receiving device.

Means for Solving the Problems

[1] A receiving device according to one aspect of the present invention includes: an output unit configured to output content broadcast from a transmitting device; an application execution unit configured to execute an application; a security policy acquiring unit configured to acquire security policy level data sent from the transmitting device with respect to the application, the security policy level data indicating a sorted level of the application; a policy level acquiring unit configured to acquire policy level data sent from the transmitting device with respect to currently broadcast content, the policy level data indicating a sorted level of the currently broadcast content; a determining unit configured to determine whether or not the application is an application to be controlled, based on the policy level data acquired by the policy level acquiring unit and the security policy data of the application acquired by the security policy acquiring unit; and an application control unit configured to instruct the application execution unit to control the application determined to be the application to be controlled.

According to this aspect, the receiving device that receives and outputs content to be broadcast, receives, by an arbitrary sending method such as broadcasting or communication, from the transmitting device that transmits content, the security policy level data indicating a sorted level of each application installed in the receiving device, and the policy level data indicating a sorted level of currently broadcast content. The receiving device controls an application that is determined to be an application to be controlled, based on the policy level data of the currently broadcast content and the security policy data of each application. For example, the receiving device boots the application associated with the level indicated by the security policy data that is higher than or equal to the level indicated by the policy level data of the currently broadcast content, and terminates the application associated with the level indicated by the security policy level that is lower than or equal to the level indicated by the policy level data of the currently broadcast content.

Thus, the transmitting device that broadcasts content sends the policy level data of the currently broadcast content and the security policy data of each application, which are set by the broadcasting organization. Therefore, it is possible to control the receiving device receiving the content that is broadcast to control the application in accordance with the currently broadcast content, as intended by the broadcasting organization.

[2] The aforementioned receiving device according to one aspect of the present invention, the policy level acquiring unit is configured to acquire a relationship between a broadcast schedule of content and the security policy level data of the application, the relationship being transmitted from the transmitting device. The determining unit is configured to determine whether or not the application is the application to be controlled based on the policy level data of the currently broadcast content acquired by the policy level acquiring unit and the security policy level data of the application read from the storage unit in association with the currently broadcast content.

According to this aspect, the receiving device previously receives from the transmitting device, the relationship between the broadcast schedule of content and the security policy data of an application, and stores the received relationship. Then, based on the policy level data of the currently broadcast content and the security policy level data of the application associated with the content received before that content is broadcast, the receiving device determines whether or not the application is an application to be controlled.

Thus, it is possible to control the receiving device to previously store the security policy data of the application, thereby reducing an interval from the time when the policy level data of the currently broadcast content is received to the time when the application is controlled.

[3] The aforementioned receiving device according to one aspect of the present invention further includes a policy management unit configured to acquire a broadcast schedule of content and the policy level of the content which are transmitted from the transmitting device, and write the broadcast schedule and the policy level in a storage unit. The determining unit is configured to determine current policy level data based on the policy level date of the currently broadcast content acquired by the policy level acquiring unit and the policy level data read from the storage unit in association with the currently broadcast content, and determine whether or not the application is the application to be controlled based on the current policy level data determined and the security policy level data of the application.

According to this aspect, the receiving device previously receives the broadcast schedule and the policy level of content to be broadcast, and stores the received informations. The receiving device determines current policy level data based on the policy level data of the currently broadcast content and the policy level data of the content which is received before the content is broadcast. Then, the receiving device determines whether or not to boot the application using the determined current policy level data. For example, in a case where the policy level data of the currently broadcast content received in real time is different from the policy level data of the content which is received before the content is broadcast, a greater one of those policy level data is determined to be the current policy level data.

Thus, in a case where emergent content occurs while general content to be broadcast is broadcast, it is possible to control the receiving device to terminate the application being booted in association with the general content, and boot the application associated with the emergent content.

[4] A transmitting device according to one aspect of the present invention includes: a broadcast sending unit configured to broadcast a broadcast signal to which content is set; and a data communication unit configured to transmit data by communication. security policy level data indicating a sorted level of an application is broadcast by the broadcast sending unit using the broadcast signal, or is transmitted by the data communication unit executing communication. Policy level data indicating a sorted level of currently broadcast content is broadcast by the broadcast sending unit using the broadcast signal or is transmitted by the data communication unit executing communication.

According to this aspect, the transmitting device that broadcasts content sends, by an arbitrary sending method such as broadcasting or communication, the policy level data indicating a sorted level of currently broadcast content, and the security policy level data indicating a sorted level of each application installed in the receiving device.

Thus, the transmitting device that broadcasts content can send the policy level data of the currently broadcast content and the security policy data of each application, to the receiving device by broadcasting or communication that the transmitting device appropriately selects.

[5] A broadcasting system according to one aspect of the present invention includes: a transmitting device configured to broadcast content; and a receiving device configured to receive and output the content broadcast. The transmitting device includes a sending unit configured to send security policy level data indicating a sorted level of an application, and policy level data indicating a sorted level of currently broadcast content. The receiving device includes: an application execution unit configured to execute an application; a security policy acquiring unit configured to acquire the security policy level data sent from the transmitting device with respect to the application; a policy level acquiring unit configured to acquire the policy level data sent from the transmitting device with respect to the currently broadcast content; a determining unit configured to determine whether or not the application is an application to be controlled, based on the policy level data acquired by the policy level acquiring unit and the security policy data of the application acquired by the security policy acquiring unit; and an application control unit configured to instruct the application execution unit to control the application determined to be the application to be controlled.

According to this aspect, the transmitting device, which broadcasts content, sends, by an arbitrary sending method such as broadcasting or communication, the policy level data indicating a sorted level of currently broadcast content, and the security policy level data indicating a sorted level of each application installed in the receiving device. The receiving device, which receives and outputs content to be broadcast, controls an application that is determined to be an application to be controlled, based on the policy level data of the currently broadcast content and the security policy data of each application. For example, the receiving device boots the application associated with the level indicated by the security policy data that is higher than or equal to the level indicated by the policy level data of the currently broadcast content, and terminates the application associated with the level indicated by the security policy level that is lower than or equal to the level indicated by the policy level data of the currently broadcast content.

Thus, the transmitting device, which broadcasts content, sends the policy level data of the currently broadcast content and the security policy data of each application, which are set by the broadcasting organization. Therefore, it is possible to control the receiving device receiving the content that is broadcast to control the application in accordance with the currently broadcast content, as intended by the broadcasting organization.

[6] A non-transitory computer-readable recording medium according to one aspect of the present invention stores a program to be executed by a computer of a receiving device to as perform: outputting content broadcast application; acquiring security policy level data sent from the transmitting device with respect to the application, the security policy level data indicating a sorted level of the application; acquiring policy level data sent from the transmitting device with respect to currently broadcast content, the policy level data indicating a sorted level of the currently broadcast content; determining whether or not the application is an application to be controlled, based on the policy level data and the security policy data of the application acquired; and controlling the application determined to be the application to be controlled.

A receiving method according to one aspect of the present invention includes: outputting content broadcast from a transmitting device; executing an application; acquiring security policy level data sent from the transmitting device with respect to the application, the security policy level data indicating a sorted level of the application; acquiring policy level data sent from the transmitting device with respect to currently broadcast content, the policy level data indicating a sorted level of the currently broadcast content; determining whether or not the application is an application to be controlled, based on the policy level data and the security policy data of the application acquired; and controlling the application determined to be the application to be controlled.

Effects of the Invention

According to the present invention, it is possible for a transmitting device to control applications installed in a receiving device in accordance with content to be broadcast.

BRIEF DESCRIPTION OF THE DRAWINGS

FIG. 2 is a diagram illustrating an example of a description of a policy level of a real-time event in a broadcast signal according to the first embodiment.

FIG. 3 is a diagram illustrating another example of a description of a policy level of a real-time event in a broadcast signal according to the first embodiment.

FIG. 4 is a diagram illustrating a data structure of an application security policy according to the first embodiment.

FIG. 7 is a diagram illustrating an example of a data structure of an event schedule security policy according to the second embodiment.

FIG. 8 is a diagram illustrating an example of description of a program policy level in a broadcast signal according to the second embodiment.

FIG. 9 is a diagram illustrating an example of a description of a start application ID in a broadcast signal according to the second embodiment.

FIG. 10 is a diagram illustrating another example of a description of an event schedule security descriptor in a broadcast signal according to the second embodiment.

FIG. 13 is a diagram illustrating a program policy descriptor in a broadcast signal according to the third embodiment.

FIG. 14 is a diagram illustrating a data structure of an event security policy according to the third embodiment.

FIG. 15 is a diagram illustrating an event security descriptor in a broadcast signal according to the third embodiment.

FIG. 18A is a diagram illustrating an example of a description of an application security policy according to the fourth embodiment.

FIG. 18B is a diagram illustrating an example of a description of an application security policy according to the fourth embodiment.

FIG. 24 is a diagram illustrating another example of an event security descriptor in a broadcast signal.

FIG. 25 is a diagram illustrating another example of an event security descriptor in a broadcast signal.

FIG. 26A is a diagram illustrating another example of an event security descriptor in a broadcast signal.

FIG. 26B is a diagram illustrating another example of an event security descriptor in a broadcast signal.

BEST MODE FOR CARRYING OUT THE INVENTION

Hereinafter, embodiments of the present invention are explained with reference to drawings.

1. First Embodiment

Figure 1:
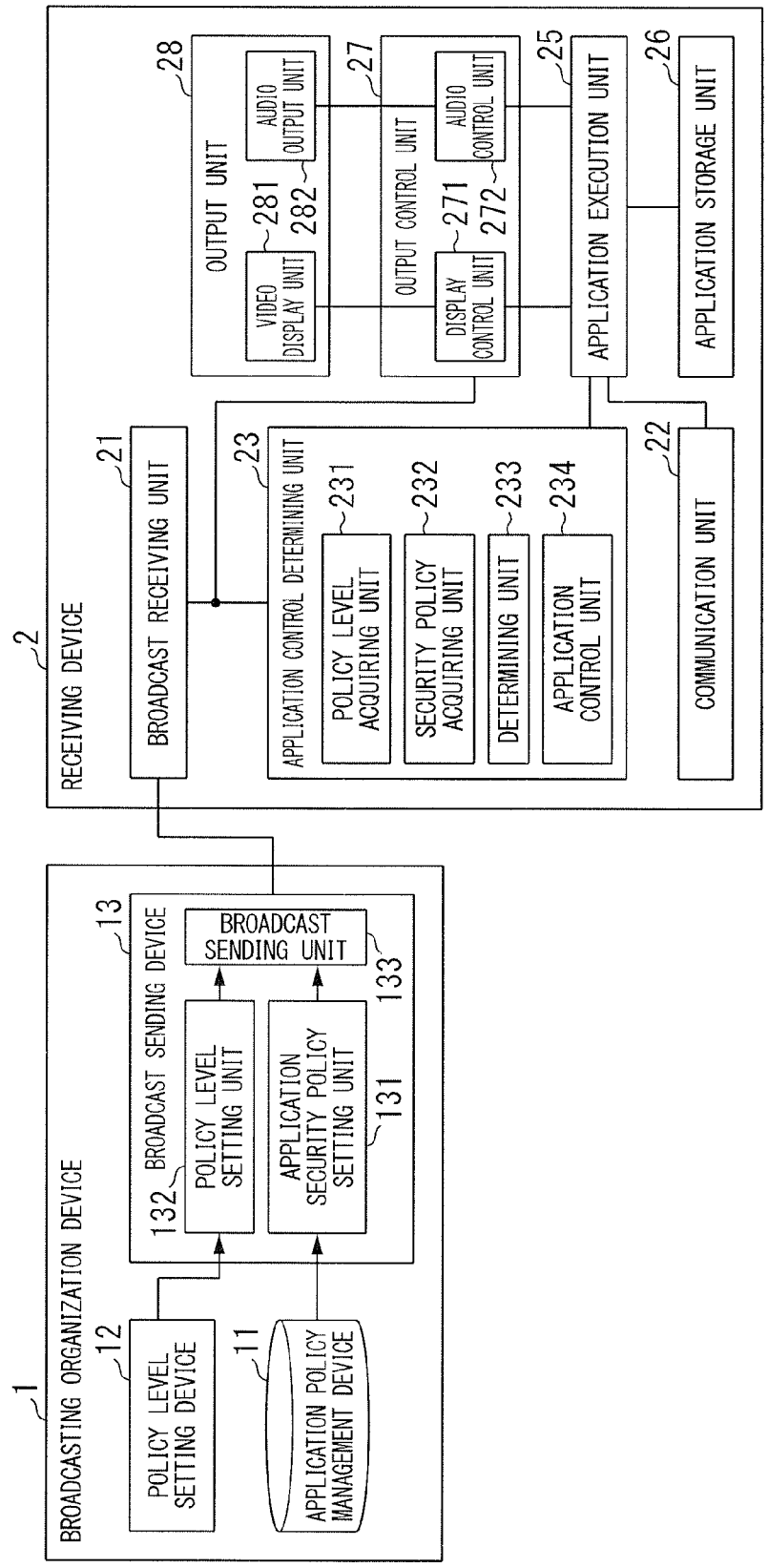
FIG. 1 is a functional block diagram illustrating a broadcasting system according to a first embodiment of the present invention.

FIG. 1 is a functional block diagram illustrating a broadcasting system according to a first embodiment of the present invention. As shown in FIG. 1, a broadcasting system of the first embodiment includes: a broadcasting organization device 1 (transmitting device) that broadcasts content; and a receiving device 2 that receives and displays content that is broadcast. Only one receiving device 2 is shown in FIG. 1, but multiple devices are included.

The broadcasting system of the first embodiment implements cooperative communication/broadcasting hybrid services. Regarding the hybrid services, for example, in a case where a broadcast receiver can execute various application programs (hereinafter referred to as "applications"), the broadcast receiver simultaneously displays a window for content that is broadcast (hereinafter referred to as "broadcast window") and a window for content acquired by an application via the Internet (hereinafter referred to as "application window"). In the broadcasting system of the first embodiment, regarding such cooperative communication/broadcasting services, a broadcasting organization device 1 owned by a broadcasting organization controls applications installed in a receiving device 2 owned by a viewer.

To perform such a control, the broadcasting organization device 1 broadcasts to the receiving device 2, policy level data of a real-time event (hereinafter referred to as "policy level")

and application security policy data (hereinafter referred to as "application security policy").

The application security policy includes a control code and security policy level data (hereinafter referred to as "security policy level") of each application. The control code indicates a command with respect to an application. The security policy level indicates a sorted level of an application.

Additionally, the real-time event is, for example, an event (content) on the air. An event includes, for example, a program event (general content) that is a broadcast program, and an asynchronous event (emergent content), such as an earthquake warning that occurs in non-synchronization with a program event, a tsunami warning, and breaking news. The policy level indicates a sorted level of an event. The sorted level indicates a level of an application to be allowed to be controlled.

The receiving device 2 controls an application installed therein in accordance with the policy level and the application security policy which are received from the broadcasting organization device 1. For example, the receiving device 2 compares the policy level of a real-time event and the security policy level of each application indicated by the application security policy to determine an application to be controlled, and executes a control code of the application to be controlled.

Accordingly, a broadcasting organization appropriately sets the policy level of a real-time event and the application security policy, and the broadcasting organization device 1 broadcasts the policy level and the application security policy, so that the applications installed in the receiving device 2 can be collectively controlled as intended by the broadcasting organization.

The broadcasting organization device 1 includes an application policy management device 11, a policy level setting device 12, and a broadcast sending device 13.

The application policy management device 11 is a computer server that stores a security policy of each application. The security policy includes a control code and a security policy level. The policy level setting device 12 is a computer server that stores a policy level of a real-time event.

The broadcast sending device 13 is a broadcasting facility for digital broadcast that includes a program making facility, a program sending facility, a transmitting facility, and the like. The broadcast sending device 13 includes an application security policy setting unit 131, a policy level setting unit 132, and a broadcast sending unit 133 (sending unit). The application security policy setting unit 131 reads a security policy of each application from the application policy management device 11, and sets to a broadcast signal, an application security policy including the read security policy of each application. The policy level setting unit 132 reads a policy level of a real-time event from the policy level setting device 12 and sets the policy level to the broadcast signal. The broadcast sending unit 133 broadcasts broadcast signals defined by the ARIB (association of radio industries and broadcast) standard.

The receiving device 2 is a device, such as a television, a set-top box, a personal computer, or a mobile terminal. The receiving device 2 includes: a broadcast receiving unit 21; a communication unit 22; an application control determining unit 23; an application execution unit 25; an application storage unit 26; an output control unit 27; and an output unit 28.

The broadcast receiving unit 21 is a tuner. The broadcast receiving unit 21 receives a broadcast signal of a digital broadcast and demodulates the received broadcast signal. The communication unit 22 transmits and receives data by communication via a network, such as the Internet.

The application control determining unit 23 includes: a policy level acquiring unit 231; a security policy acquiring unit 232; a determining unit 233; and an application control unit 234. The policy level acquiring unit 231 acquires a policy level of a real-time event from the demodulated broadcast signal. The security policy acquiring unit 232 acquires an application security policy from the demodulated broadcast signal. The determining unit 233 determines whether or not each application is to be controlled, based on the policy level of the real-time event acquired by the policy level acquiring unit 231, and the security policy level of each application indicated by the application security policy acquired by the security policy acquiring unit 232. The application control unit 234 outputs to the application execution unit 25, a control code described in the application security policy in association with the application to be controlled, and instructs the application execution unit 25 to execute the control code. Additionally, the application control unit 234 instructs the application execution unit 25 to terminate an application not to be controlled.

The application storage unit 26 stores applications. The application execution unit 25 executes a control code for an application in accordance with the instruction from the application control unit 234. For example, if a control code indicates a boot of an application, the application execution unit 25 reads an application from the application storage unit 26 and executes the application.

The output control unit 27 includes a display control unit 271 and an audio control unit 272. The output unit 28 includes a video display unit 281 and an audio output unit 282. The display control unit 271 controls the video display unit 281 to display a broadcast window for displaying video data acquired from the demodulated broadcast signal, and an application window for displaying video data of content outputted from the application being executed by the application execution unit 25. The audio control unit 27 controls the audio output unit 282 to output broadcast sound based on audio data acquired from the demodulated broadcast signal. The video display unit 281 is a display that displays a window. The audio output unit 282 is a speaker that outputs sound.

Here, in the first embodiment, only applications that can be recognized by a broadcasting organization are allowed to be applications to be controlled. The applications that can be recognized by the broadcasting organization include an application generated by a broadcasting organization and an application certified by the broadcasting organization. Those applications may be applications written in the application storage unit 26 of the receiving device 2 at the time of shipping. Additionally, those applications may be: applications that the receiving device 2 receives after shipping, via an arbitrary transmission path, such as broadcasting or communication; or applications that the receiving device 2 reads from a computer-readable recording medium after shipping and writes in the application storage unit 26. Further, an application may not be an application that outputs content acquired via the Internet. For example, an application may be an application that displays time based on a clock included in the receiving device 2.

Subsequently, descriptions of a policy level and an application security policy in a broadcast signal are explained.

FIG. 2 is a diagram illustrating an example of a description of a policy level of a real-time event in a broadcast signal. In the example shown in FIG. 2, in order to set a policy level, the structure of ait_identifier_info( ), which is defined in the ARIB STD-B23, is partially redefined.

A PMT (program map table) included in a broadcast signal is associated with one program event of one channel, and includes information that specifies TS (transport stream) packets of that program event. The TS packets carry an ES (elementary stream) that is video data and audio data of a program event compressed by an MPEG (moving picture experts group)-2. The PMT further includes information that specifies TS packets that carry an ES of an AIT (application information table). The information that specifies the TS packets includes a data coding scheme descriptor for the ES of the AIT. Here, the AIT includes data that carries additional application information for specifying and controlling an application.

As shown in FIG. 2, policy_level, which is a new description for setting a policy level, is added to the structure of ait_identifier_info( ) described in a selector region of the data coding scheme descriptor for the ES of the AIT. The policy level setting unit 132 of the broadcast sending device 13 sets a policy level of a real-time event to the added policy_level. In a case where the description contents of the AIT are updated, the policy level setting unit 132 updates a version number to be set to AIT_version_number, and further updates a set value of version_number defined in the AIT.

A policy level of a real-time event is data having a value selectable from three or more different values, but may be data having only a value which is 0 or 1. In the first embodiment, a priority associated with the type of real-time event, such as a program event, an earthquake warning, a tsunami warning, or breaking news, is used as a set value of the policy level.

FIG. 3 is a diagram illustrating another example of a description of a policy level in a broadcast signal. In the example of the description, as shown in FIG. 3, a security policy descriptor (security_policy_descriptor) is newly defined. Then, this newly-defined security policy descriptor is added to the common descriptor loop of the AIT defined in the ARIB STD-B23. The policy level setting unit 132 of the broadcast sending device 13 sets a policy level of a real-time event to policy_level that is the security policy descriptor. In a case where a set value of the policy level is updated, the policy level setting unit 132 also updates a set value of version_number defined in the AIT.

FIG. 4 illustrates a data structure of an application security policy. As shown in FIG. 4, an application policy includes an application ID that identifies an application, and a security policy of the application. The security policy includes a control code for an application, and a relative priority of the application. In the first embodiment, the relative priority is used as the security policy level of the application. The control code indicates, for example, a boot of an application, but may be another control code, such as a quit of an application.

The policy level setting unit 132 of the broadcast sending device 13 uses the AIT defined in the ARIB STD-B23, multiplexes security policies of all applications to be provided at a given time, and sends the multiplexed security policies as a control signal. Thus, the broadcast sending device 13 sends the application security policies by means of a broadcast signal. The policy level setting unit 132 describes an application ID in application_identifer included in the application information descriptor loop of the AIT, and describes a control code of an application in application_control_code. Further, the policy level setting unit 132 describes a relative priority of the application in application_priority included in the application descriptor included in the application information descriptor loop.

In the above manner, the receiving device 2 can acquire the policy level at the current time from the PMT in the received broadcast signal, and determine whether or not the description contents of the AIT have been updated, based on the version number of the AIT set to the PMT. Additionally, it is possible to acquire from the AIT specified by the PMT, priorities and control codes of all applications at the current time.

Subsequently, operation of the broadcasting system of the first embodiment is explained.

The application policy management device 11 stores a relationship between an application ID and a security policy. The policy level setting device 12 stores a policy level of a real-time event. The application security policy setting unit 131 of the broadcast sending device 13 sets to a broadcast signal, an application security policy including the application ID and the security policy of each application read from the application policy management device 11.

At the same time, the policy level setting unit 132 of the broadcast sending device 13 reads the policy level of the real-time event stored in the policy level setting device 12, and sets the read policy level to the broadcast signal. The broadcast sending unit 133 sends the broadcast signal to which the application security policy setting unit 131 sets the application security policy, and the policy level setting unit 132 sets the policy level. The policy level of the real-time event and the application security policy are periodically sent by the broadcast signal.

In a case where it is necessary to change the security policy of an application, the broadcasting organization inputs the application ID and the changed security policy of the application to the application policy management device 11. The application policy management device 11 stores the input application ID and the input security policy. Thus, the application security policy setting unit 131 of the broadcast sending device 13 reads from the application policy management device 11, the application ID and the updated security policy, and sets the application ID and the updated security policy to a broadcast signal.

Additionally, in a case where it is necessary to change the policy level, such as in a case where an asynchronous event occurs or ends, the broadcasting organization inputs the changed policy level to the policy level setting device 12. The policy level setting device 12 stores the input policy level of the real-time event. Thus, the policy level setting unit 132 of the broadcast sending device 13 reads the updated policy level and sets the updated policy level to a broadcast signal.

Figure 5:
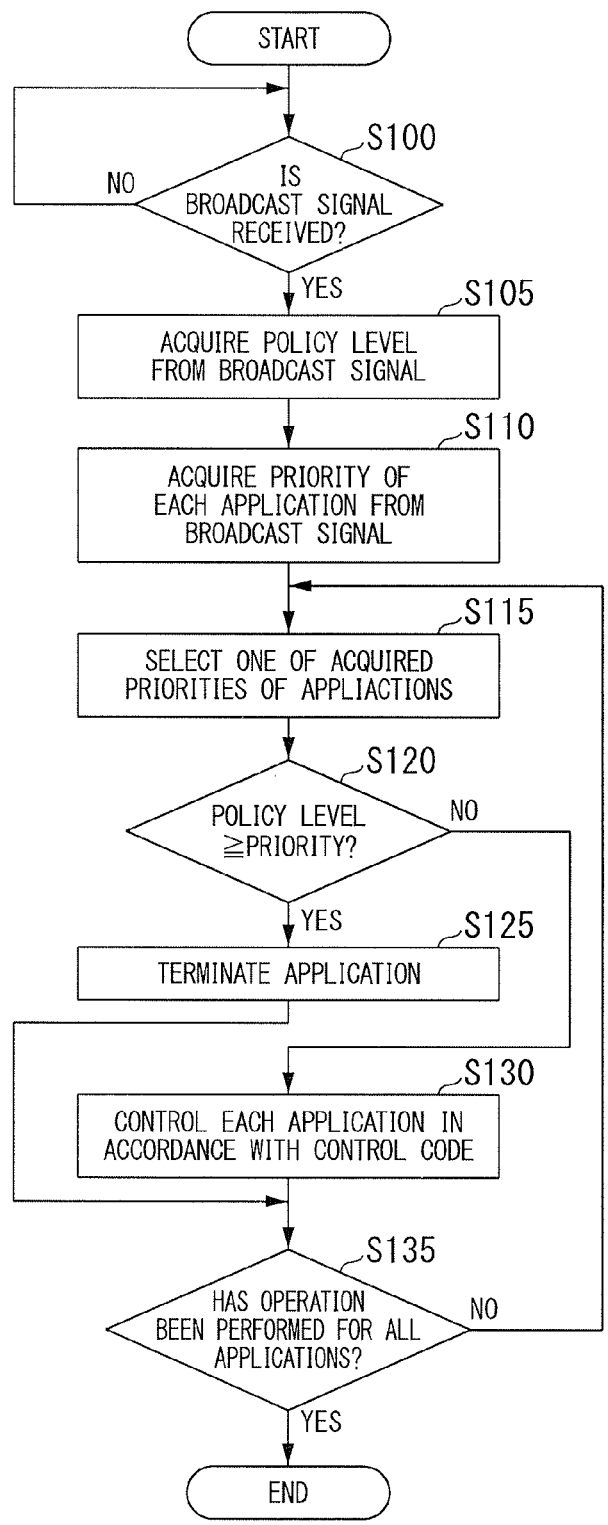
FIG. 5 illustrates process flow for a receiving device of the first embodiment.

FIG. 5 illustrates process flow for the receiving device 2 of the first embodiment.

In a case where the broadcast receiving unit 21 of the receiving device 2 does not receive a broadcast signal (step S100: NO), the broadcast receiving unit 21 enters a state of waiting to receive a broadcast signal. On the other hand, in a case where the broadcast receiving unit 21 of the receiving device 2 receives a broadcast signal sent from the broadcast sending device 13 (step S100: YES), the broadcast receiving unit 21 demodulates the received broadcast signal and outputs the demodulated broadcast signal to the application control determining unit 23 and the output control unit 27.

The policy level acquiring unit 231 of the application control determining unit 23 acquires the policy level of the real-time event from the PMT or the AIT in the demodulated broadcast signal (step S105). Here, in a case where the policy level of the real-time event is acquired from the AIT, the policy level acquiring unit 231 may acquire the policy level from the AIT in the broadcast signal only in a case where the version number of the AIT has been updated. In a case where the version number of the AIT has not been updated, the policy level acquiring unit 231 sets to the policy level acquired in step S105, the policy level acquired at the time of the update to the current version number.

The security policy acquiring unit 232 acquires from the AIT in the demodulated broadcast signal, an application security policy including a set of an application ID and a security policy of each application, the security policy including a control code and a priority (step S110). Here, the security policy acquiring unit 232 may acquire the application security policy from the AIT in the broadcast signal only in a case where the version number of the AIT has been updated.

In a case where the version number of the AIT has not been updated, the security policy acquiring unit 232 sets to the application security policy acquired in step S110, the application security policy acquired at the time of the update to the current version number.

The determining unit 233 selects one of the application IDs acquired in step S110, and acquires the priority associated with the selected application ID (step S115). The determining unit 233 compares the priority acquired in step S115 and the policy level acquired by the policy level acquiring unit 231 in step S105 (step S120). In a case where the determining unit 233 determines that the priority is lower than or equal to the policy level (step S120: YES), the application control unit 234 outputs to the application execution unit 25, the application ID selected in step S115 and an instruction to terminate the application. The application execution unit 25 terminates the application identified by the application ID received from the application control unit 234 in a case where that application is running, but performs no operation in a case where that application is not running (step S125).

On the other hand, in a case where the determining unit 233 deter mines in step S120 that the priority is higher than the policy level (step S120: NO), the application control unit 234 outputs to the application execution unit 25, the application ID selected in step S115 and the control code associated with the application ID. The application execution unit 25 executes the received control code on the application identified by the application ID received from the application control unit 234 (step S130). For example, in a case where the control code indicates a command to boot an application, the application execution unit 25 reads the application identified by the application ID from the application storage unit 26, and executes the application. The application execution unit 25 executes the application, thus acquiring, via the communication unit 22, content provided on the network.

The display control unit 271 controls the video display unit 281 to display a window for displaying video data acquired from the broadcast signal demodulated by the broadcast receiving unit 21, and a window for displaying video data of the application outputted from the application execution unit 25. Additionally, the audio control unit 272 controls the audio output unit 282 to output broadcast sound based on the audio data acquired from the broadcast signal demodulated by the broadcast receiving unit 21.

After step S125 or step S130, the determining unit 233 determines whether or not an application ID having not yet been selected is included in the application IDs acquired in step S110. In a case where there is an application ID having not yet been selected, the operation from the step S115 is repeated (step S135: NO). In a case where all the application IDs have already been selected, the operation ends (step S135: YES).

Here, the display control unit 271 determines, in step S130, the layout of an application window and a broadcast window in accordance with a predetermined arbitrary rule (such as whether or not overlay-display is allowed, and to what degree two windows are overlaid). For example, the display control unit 271 may determine the layout of the application window and the broadcast window based on one or both of the policy level of the real-time event and the security policy level of the application.

Additionally, in a case where the application being executed by the application execution unit 25 outputs audio data, the audio control unit 272 may determine, in accordance with a predetermined arbitrary rule, a method of outputting broadcast sound and application sound that is based on the audio data outputted from the application. Then, the audio control unit 272 may control the audio output unit 282 to output the broadcast sound and the application sound in accordance with the determined audio outputting method. The audio control unit 272 may determine that audio outputting method (such as whether the broadcast sound is outputted independently of or mixed with the application sound), based on one or both of the policy level of the real-time event and the security policy level of the application.

Further, in a case where the control code indicates a command other than the command to boot an application, the application control unit 234 may, in step S130, execute the control code after booting the application identified by the application ID. Alternatively, the application control unit 234 may execute the control code only in a case where the application identified by the application ID is being executed. For example, in a case where the control code is a command to instruct an application window displaying method, the application control unit 234 instructs the layout of the application window and the broadcast window to the display control unit 271 in accordance with the control code. Similarly, in a case where the control code is a command to instruct an audio outputting method, the application control unit 234 instructs the audio outputting method to the audio control unit 272 in accordance with the control code.

According to the embodiment explained above, the broadcasting organization can control a boot or quit of applications installed in the receiving device 2, in accordance with content being currently broadcast from the broadcast sending device 13. Accordingly, even in a case where an event not synchronized with a program event occurs, the broadcast sending device 13 can control a boot or quit of applications installed in the receiving device 2 in a manner as determined by the broadcasting organization with respect to that asynchronous event.

2. Second Embodiment

Figure 6:
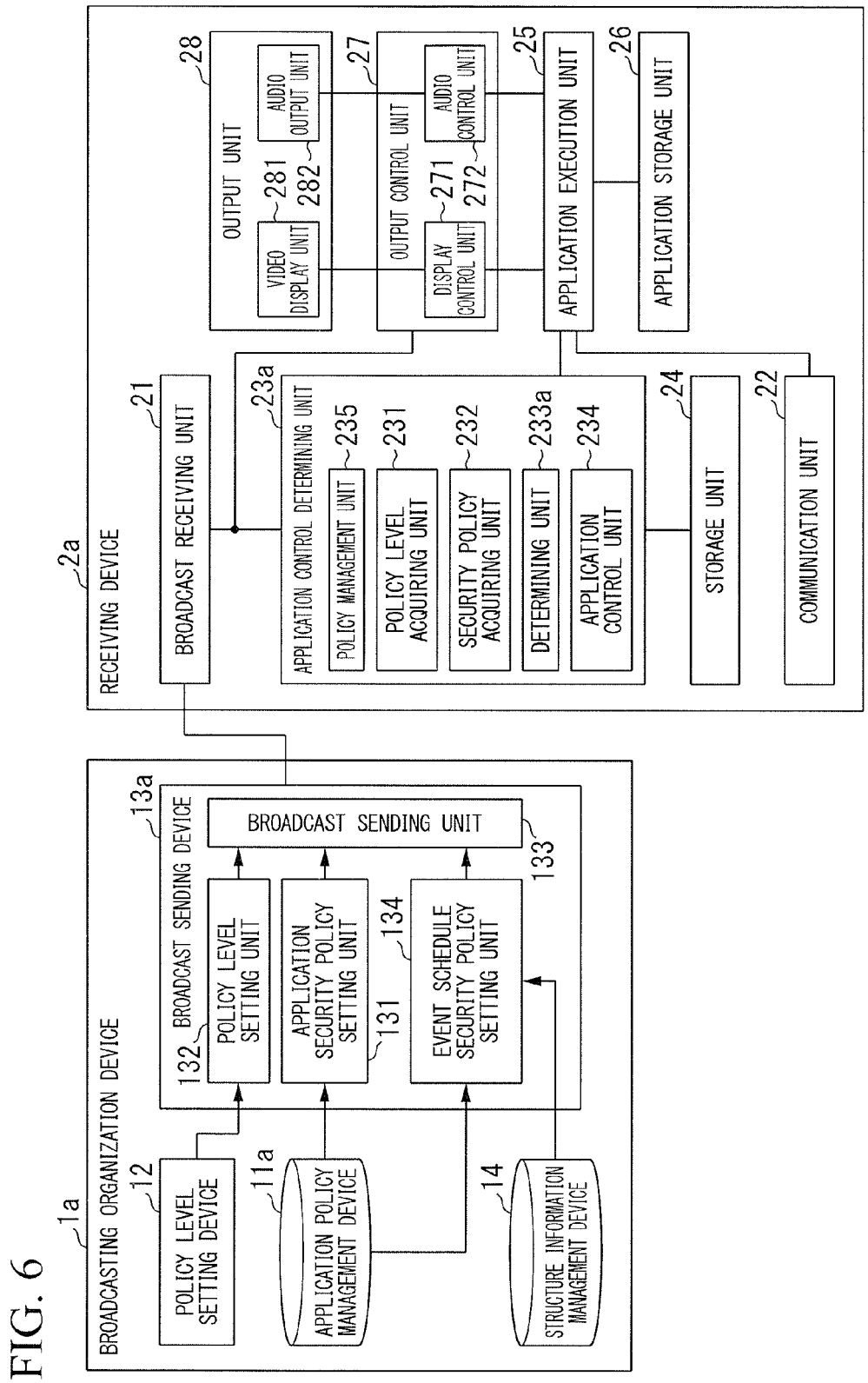
FIG. 6 is a functional block diagram illustrating a broadcasting system according to a second embodiment of the present invention.

FIG. 6 is a functional block diagram illustrating a broadcasting system according to a second embodiment of the present invention. In FIG. 6, the same block as included in the broadcasting system of the first embodiment shown in FIG. 1 is appended with the same reference numeral, and an explanation thereof is omitted here. The broadcasting system of the second embodiment shown in FIG. 6 includes a broadcasting organization device 1a in lieu of the broadcasting organization device 1 of the first embodiment, and a receiving device 2a in lieu of the receiving device 2 of the first embodiment.

In the aforementioned first embodiment, the broadcasting organization device 1 broadcasts to the receiving device 2 by means of a broadcast signal, the policy level of a real-time event, and the application security policy while that real-time event is occurring. In the present embodiment, the broadcasting organization device 1a further broadcasts to the receiving device 2a, event schedule security policy data indicating a program policy for each program event to be broadcast hereafter (hereinafter referred to a "event schedule security policy"). The program policy indicates: a policy level indicating a sorted level of a program event (hereinafter referred to as a "program policy level"); and a start application that is an application to be booted at the time when that program event is broadcast. The receiving device 2a determines whether or not each application is an application to be controlled, using the program policy level at the current time which is indicated by the already-received event schedule security policy, and the policy level of a real-time event. Then, the receiving device 2a performs a control of the application, such as a boot or quit of the application. Thus, each application installed in the receiving device 2a is collectively controlled as intended by the broadcasting organization. Hereinafter, differences from the first embodiment are mainly explained.

The broadcasting organization device 1a shown in FIG. 6 differs from the broadcasting organization device 1 of the first embodiment shown in FIG. 1 in that the broadcasting organization device 1a includes an application policy management device 11a in lieu of the application policy management device 11, and a broadcast sending device 13a in lieu of the broadcast sending device 13, and further includes a structure information management device 14.

The application policy management device 11a is a computer server that stores a security policy of each application, and stores, for each program event, a program policy level and a start application. The structure information management device 14 is a computer server that stores the broadcast time of each program event.

The broadcast sending device 13a differs from the broadcast sending device 13 of the first embodiment shown in FIG. 1 in that the broadcast sending device 13a includes an event schedule security policy setting unit 134. The event schedule security policy setting unit 134 refers to the broadcast time of each program event stored by the structure information management device 14, and specifies a program event to be broadcast hereinafter. The event schedule security policy setting unit 134 reads from the application policy management device 11a, the policy level and the start application of the specified program event. Then, the event schedule security policy setting unit 134 sets to a broadcast signal, an event schedule security polity including those read informations. Further, the event schedule security policy setting unit 134 reads the broadcast time of the specified program event from the structure information management device 14, and sets the read broadcast time to the broadcast signal.

The receiving device 2a shown in FIG. 6 differs from the receiving device 2 of the first embodiment shown in FIG. 1 in that the receiving device 2a includes an application control determining unit 23a in lieu of the application control determining unit 23, and further includes a storage unit 24.

The storage unit 24 stores an event schedule security policy and the broadcast time of a program event.

The application control determining unit 23a differs from the application control determining unit 23 of the first embodiment shown in FIG. 1 in that the application control determining unit 23a includes a policy management unit 235, and a determining unit 233a in lieu of the determining unit 233. The policy management unit 235 acquires the event schedule security policy and the broadcast time of a program event from the broadcast signal demodulated by the broadcast receiving unit 21, and writes the acquired event schedule security policy and the broadcast time in the storage unit 24. The determining unit 233a reads from the storage unit 24, the program policy level of the program event on the air. Then, the determining unit 233a compares the read program policy level and the policy level of the real-time event acquired by the policy level acquiring unit 231, and thus determines the current policy level. Additionally, the determining unit 233a compares the start application stored in the storage unit 24 in association with the program event on the air, and the application to be booted which is set to the application security policy acquired by the security policy acquiring unit 232, and thus updates the start application. The determining unit 233a determines an application to be booted in accordance with the current policy level and the priority of the start application, and instructs the determined application to the application control unit 234.

In the second embodiment, the policy level of the real-time event and the application security policy are described in the broadcast signal, similarly to the first embodiment. Hereinafter, descriptions of the broadcast time of a program event and an event schedule security policy in a broadcast signal are explained.

First, setting of the broadcast time of a program event is explained. A broadcast signal defined by the ARIB standard includes SI (service information). Information as used for an electronic program guide (EPG) or the like is described in the SI. An EIT (event information table) constituting the SI is set with a program event on the air and information concerning a program event to be broadcast hereafter, and includes a descriptor loop including an event ID of a program event, the broadcast time thereof, and the like. The broadcast sending device 13a sets, as done in the related art, the broadcast time of each program event to the EIT in accordance with the provisions defined by the ARIB standard.

Next, setting of an event schedule security policy is explained.

FIG. 7 illustrates an example of a data structure of an event schedule security policy. As shown in FIG. 7, the event schedule security policy is data including a program ID that identifies a program event, a program policy level, and a start application ID that is an application ID of a start application, which are associated with one another. A start application should be booted at the start of a program, and therefore a priority of the start application is assumed to be equal to or higher than that of the program policy level. However, it is assumed in the second embodiment that the priority of the start application is equal to that of the program policy level.

FIG. 8 is a diagram illustrating an example of a description of a program policy level in a broadcast signal. In the example shown in FIG. 8, the event schedule security policy is set to the EIT constituting the SI. As explained above, the EIT includes a loop of descriptors associated with the respective program events, and user_nibble, which is included in a content descriptor (content_descriptor) to be described in that loop, is used. The event schedule security policy setting unit 134 of the broadcast sending device 13a sets a program policy level to user_nibble.

FIG. 9 is a diagram illustrating an example of a description of a start application ID in a broadcast signal. A loop of descriptors associated with the respective events included in the EIT includes a data content descriptor. The event schedule security policy setting unit 134 of the broadcast sending device 13a describes in additional information of a data content descriptor associated with a program event, the structure of arib_j_info( ) defined in the ARIB STD-B23. The event schedule security policy setting unit 134 sets the start application ID to application_identifier included in the structure of arib_j_info( ).

FIG. 10 is a diagram illustrating another example of a description of an event schedule security policy in a broadcast signal. As a method different from those describing methods explained with regard to FIGS. 8 and 9, an event schedule security descriptor is newly defined and described in a descriptor region in the descriptor loop of the EIT. FIG. 10 shows a structure of the newly-defined event schedule security descriptor. The event schedule security policy setting unit 134 of the broadcast sending device 13a adds the event schedule security descriptor to the descriptor region associated with the event ID of a program event included in the EIT, sets a program policy level to event_poly_level, sets the start application ID to application_identifier, and sets a control code indicating a boot to application_control_code.

The event schedule security descriptor shown in FIG. 10 includes associated_application_flag, which is a description region of a program related flag. The program related flag is information indicating whether or not an application is related to a program event. The application control unit 234 of the receiving device 2a may use a set value of the program related flag for the purpose of determining the layout of a broadcast window and an application window, and a method of outputting broadcast sound and application sound.

In the above manner, the receiving device 2a can acquire the policy level at the current time from the PMT included in the received broadcast signal, and determine whether or not the description contents of the AIT has been updated based on the version number of the AIT set to the PMT. Additionally, the receiving device 2a receives from the received EIT, as a schedule, the policy level of a program event to be broadcast hereafter and the application ID of an application to be booted at the time when that program event is broadcast. Further, the receiving device 2a can acquire from the AIT specified by the PMT, the priorities and control codes of all applications at the current time.

Subsequently, operation of the broadcasting system of the second embodiment is explained.

The application policy management device 11a stores a relationship among an event ID of a program event, a program policy level, and a start application ID. The application policy management device 11a also stores a relationship between an application ID and a security polity at the current time. Additionally, the structure information management device 14 stores structure information. The structure information includes an event ID and the broadcast time of a program event. A broadcasting organization timely updates, as needed, the information stored by the application policy management device 11a and the structure information management device 14.

The event schedule security policy setting unit 134 of the broadcast sending device 13a refers to the broadcast time included in the structure information stored by the structure information management device 14, and specifies a predetermined number of program events to be broadcast hereafter. Then, the event schedule security policy setting unit 134 reads the event ID and the broadcast time of each of the specified program events. The event schedule security policy setting unit 134 reads from the application policy management device 11a, the policy level and the start application ID which are associated with the read event ID. Then, the event schedule security policy setting unit 134 set to a broadcast signal, an event schedule security policy including the event ID of each of the read program events, the policy level and the start application ID which are associated with the event ID. Additionally, the event schedule security policy setting unit 134 set the broadcast time of the program event to the broadcast signal.

Additionally, similar to the first embodiment, the policy level setting device 12 stores a policy level of a real-time event. The broadcasting organization timely rewrites the policy level as needed. The policy level setting unit 132 of the broadcast sending device 13a reads the policy level of the real-time event stored by the policy level setting device 12, and sets the read policy level to the broadcast signal.

The broadcast sending unit 133 sends the broadcast signal to which the event schedule security policy setting unit 134 sets the event schedule security policy and the broadcast time of the program event, the application security policy setting unit 131 sets the application security policy, and the policy level setting unit 132 sets the policy level.

Figure 11:
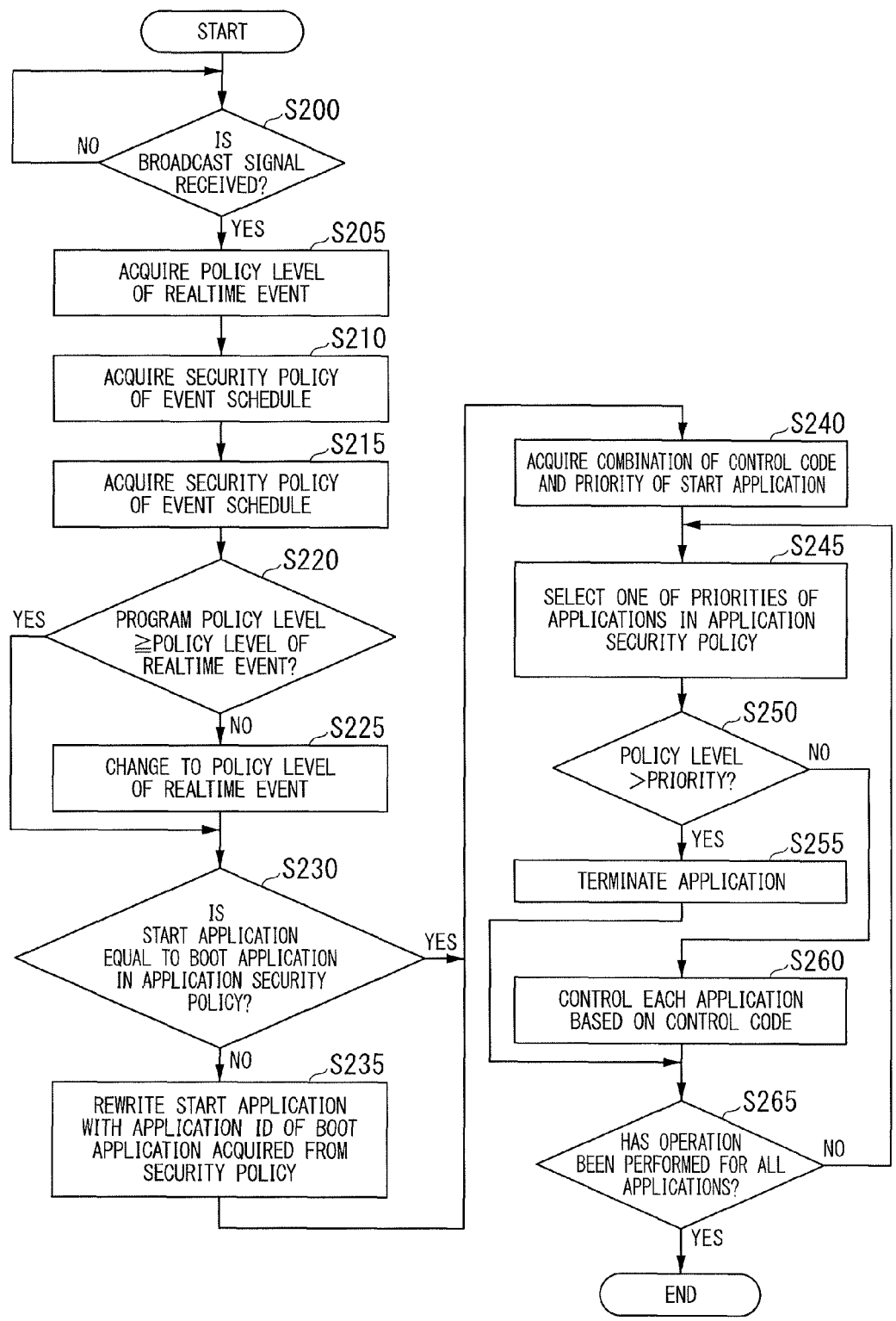
FIG. 11 is a flowchart illustrating process flow for a receiving device according to the second embodiment.

FIG. 11 illustrates process flow for the receiving device 2a according to the second embodiment.

The receiving device 2a performs processes similar to those in steps S100 to S110 of the first embodiment shown in FIG. 5 (steps S200 to S210). In other words, in a case where a broadcast signal is not received, the broadcast receiving unit 21 enters a state of waiting to receive a broadcast signal. On the other hand, in a case where a broadcast signal is received, the broadcast receiving unit 21 demodulates the received broadcast signal and outputs the demodulated broadcast signal to the application control determining unit 23a and the output control unit 27. The policy level acquiring unit 231 of the application control determining unit 23a acquires the policy level of the real-time event from the PMT or the AIT in the demodulated broadcast signal. The security policy acquiring unit 232 acquires an application security policy from the AIT in the demodulated broadcast signal.

Then, the policy management unit 235 acquires from the EIT in the demodulated broadcast signal, the event schedule security policy, and the event ID and the broadcast time of each program event, and writes the acquired informations in the storing unit 24, (step S215). The policy management unit 235 refers to the broadcast time stored in the storage unit 24, specifies a program event on the air, and reads the program policy level associated with the event ID of the specified program event.

In a case where it is determined that the read program policy level is higher than or equal to the policy level of the real-time event acquired by the policy level acquiring unit 231 in step S205 (step S220: YES), the policy management unit 235 determines the program policy level to be the current policy level, and performs a process in step S230. On the other hand, in a case where it is determined that the read program policy level is lower than the policy level of the real-time event (step S220: NO), the policy management unit 235 determines the policy level of the real-time event to be the current policy level (step S225), and performs the process in step S230.

The policy management unit 235 reads from the storage unit 24, the start application ID associated with the event ID of the program event on the air that is specified in step S220. Further, the policy management unit 235 acquires the application ID associated with the control code indicating the command "boot" from the application security policy acquired by the security policy acquiring unit 232 in step S210. Then, the policy management unit 235 determines whether or not the acquired application ID is equal to the read start application ID (step S230). In a case where it is determined that the acquired application ID is not equal to the read start application ID, the policy management unit 235 rewrites the start application ID stored in the storage unit 24 in association with the event ID of the program event on the air, with the application ID associated with the control code set with the command "boot" (step S235).

In a case where the policy management unit 235 determines in step S230 that the acquired application ID is equal to the read start application ID (step S230: YES), or after the process in step S235, the determining unit 233a reads from the storage unit 24, the start application ID associated with the event ID of the program event on the air. Then, the determining unit 233a acquires from the application security policy, the control code and the priority which are associated with the read start application ID (step S240).

The determining unit 233a selects one of the start application IDs acquired in step S240, and acquires the priority associated with the selected start application ID (step S245). The determining unit 233a compares the priority acquired in step S245 and the current policy level (step S250). In a case where the determining unit 233a determines that the priority is lower than the current policy level (step S250: YES), the application control unit 234 outputs to the application execution unit 25, the start application ID selected in step S245 and an instruction to terminate the application. The application execution unit 25 terminates the application identified by the start application ID received from the application control unit 234 in a case where that application is being executed, and performs nothing in a case where that application is not being executed (step S255).

On the other hand, in a case where the determining unit 233a determines that the priority is higher than or equal to the current policy level (step S250: NO), the application control unit 234 outputs to the application execution unit 25, the start application ID selected in step S245 and the program code associated with the start application ID. The application execution unit 25 executes the received control code on the application identified by the start application ID received from the application control unit 234 (step S260). In a case where the control code indicates a command to boot an application, the application execution unit 25 reads from the application storage unit 26, the application identified by the received start application ID and executes the read application. The display control unit 271 and the audio control unit 272 operate similarly to the first embodiment.

After step S255 or step S260, the determining unit 233a determines whether or not the start application IDs acquired in step S245 includes a start application having not yet been selected. In a case where there is a start application ID having not yet been selected, the operation is repeated from the step S245 (step S265: NO). In a case where all the start application IDs have already been selected, the operation ends (step S265: YES).

Here, as shown in FIG. 10, in a case where an event schedule policy is set to the event schedule security descriptor, the display control unit 271 determines, in step S260, the layout of a broadcast window and an application window based on the program related flag associated with the application ID. For example, in a case where the program related flag is ON, the display control unit 271 determines the layout such that the application window is overlay-displayed on the broadcast window. In a case where the program related flag is OFF, the display control unit 271 determines the layout such that the application window is displayed outside the broadcast window, or the layout such that no application window is displayed.

As explained above, the receiving unit 2a receives the application security policy in real time while managing the event policy and a start application for each program event which are previously received in accordance with the broadcast schedule, and always updates the managed policy of the program event to the newest information. The receiving device 2a performs a control determination based on the policy level received in real time and the policy of the program event managed inside, and controls the application at that time.

Here, the application security policy is real-time information and is repeatedly sent at some frequency. For this reasons, the application security policy associated with that program event is sent at substantially the same time as the time when a new program event starts. The receiving device 2a boots the start application in accordance with the application security policy to be received immediately after the program starts. Accordingly, the start application boots at substantially the same time as the time when the program starts.

According to the second embodiment, the broadcasting organization device 1a of the broadcasting organization broadcasts to the receiving device 2a, the policy level of the real-time event, the program policy level of each program event scheduled, and the security policy of each application. Thus, it is possible to boot the application installed in the receiving device 2a in accordance with the start of the program, and in a case where an asynchronous event occurs, it is possible to control a boot or quit of the application installed in the receiving device 2a as determined by the broadcasting organization with respect to that asynchronous event.

3. Third Embodiment

Figure 12:
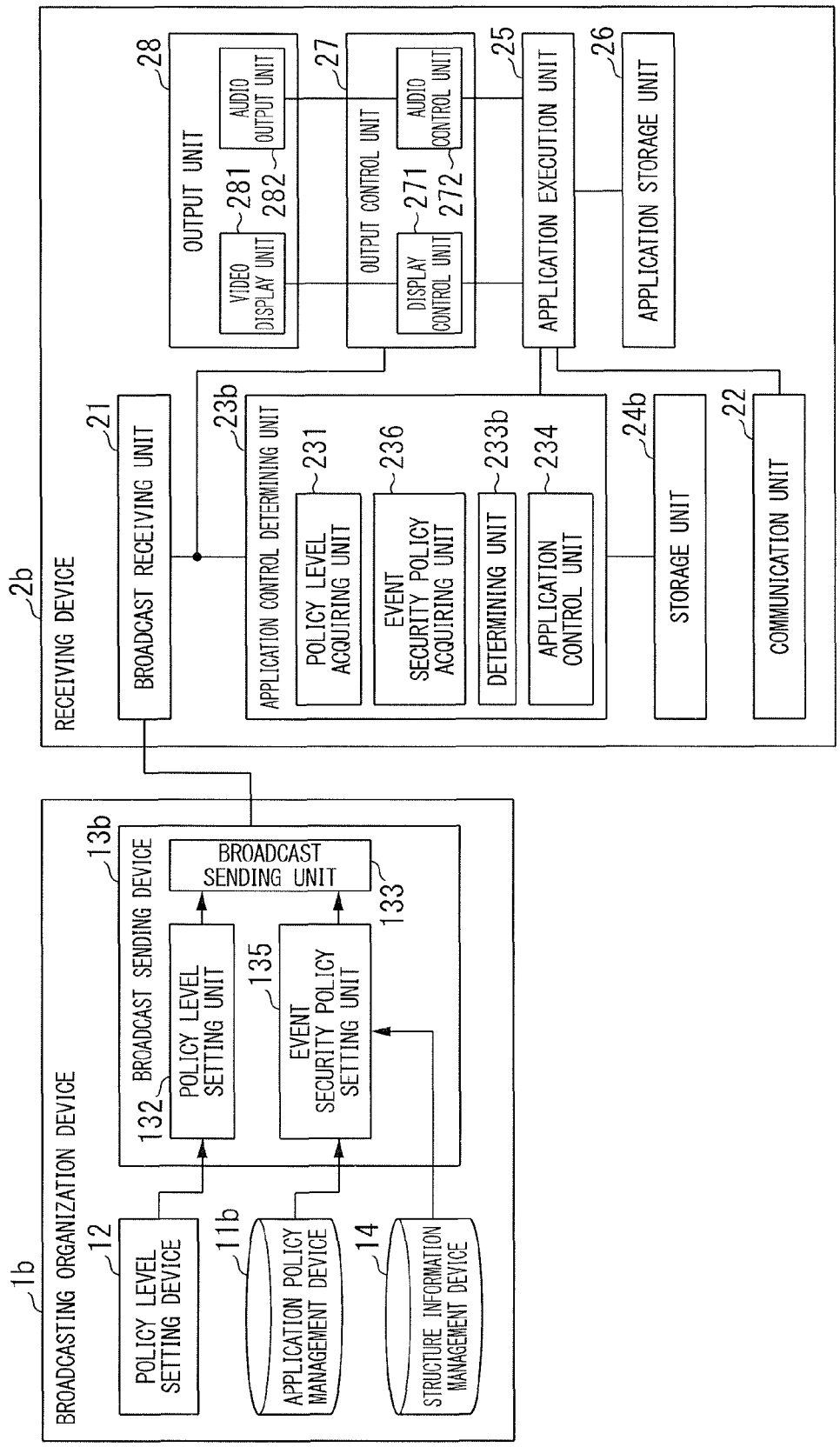
FIG. 12 is a functional block diagram illustrating a broadcasting system according to a third embodiment of the present invention.

FIG. 12 is a functional block diagram illustrating a broadcasting system according to a third embodiment of the present invention. In FIG. 12, the same block as included in the broadcasting system of the first embodiment shown in FIG. 1 and the broadcasting system of the second embodiment shown in FIG. 6 is appended with the same reference numeral, and an explanation thereof is omitted here. The broadcasting system of the third embodiment shown in FIG. 12 includes a broadcasting organization device 1b in lieu of the broadcasting organization device 1 of the first embodiment, and a receiving device 2b in lieu of the receiving device 2 of the first embodiment.

The broadcasting organization device 1 of the first embodiment and the broadcasting organization device 1a of the second embodiment broadcast the control code and the priority of the application in real time. In the third embodiment, the broadcasting organization device 1b previously broadcasts the control code and the priority of the application associated with a program event. Hereinafter, differences from the first embodiment are mainly explained.

The broadcasting organization device 1b shown in FIG. 12 differs from the broadcasting organization device 1 of the first embodiment shown in FIG. 1 in that the broadcasting organization device 1b includes: an application policy management device 11b in lieu of the application policy management device 11; and a broadcast sending device 13b in lieu of the broadcast sending device 13, and further includes the structure information management device 14 of the second embodiment shown in FIG. 14. The application policy management device 11b is a computer server that stores, in association with each program event, an application ID of an application to be controlled, and a control code and a priority of the application.

The broadcast sending device 13b differs from the broadcast sending device 13 of the first embodiment shown in FIG. 1 in that the broadcast sending device 13b includes an event security policy setting unit 135 in lieu of the application security polity setting unit 131. The event security policy setting unit 135 refers to the broadcast time of each program event stored by the structure information management device 14, and specifies a program event to be broadcast hereinafter. The event security policy setting unit 135 reads from the application policy management device 11b, the application ID associated with the specified program event, and the control code and the priority of the application. Then, the event security policy setting unit 135 sets to a broadcast signal, an event security polity including those read informations. Further, the event security policy setting unit 135 reads the broadcast time of the specified program event from the structure information management device 14, and sets the read broadcast time to the broadcast signal.

The receiving device 2b shown in FIG. 12 differs from the receiving device 2 of the first embodiment shown in FIG. 1 in that the receiving device 2b includes an application control determining unit 23b in lieu of the application control determining unit 23, and further includes a storage unit 24b.

The storage unit 24b stores an event security policy and the broadcast time of a program event.

The application control determining unit 23b differs from the application control determining unit 23 of the first embodiment shown in FIG. 1 in that the application control determining unit 23b includes: an event security policy acquiring unit 236 in lieu of the security policy acquiring unit 232; and a determining unit 233a in lieu of the determining unit 233. The event security policy acquiring unit 236 acquires from the demodulated broadcast signal, the broadcast time associated with the program event and the event security policy, and writes the acquired broadcast time and the event security policy in the storage unit 24b. The determining unit 233b reads from the event security policy stored in the storage unit 24, the priority of the application associated with the program event on the air. Then, the determining unit 233b determines an application to be controlled, based on the policy level of a real-time event and the priority of the read application.

Subsequently, descriptions of a policy level and an event security policy in a broadcast signal are explained. Here, the broadcast time of a program event is described in a broadcast signal, similarly to the second embodiment.

FIG. 13 is a diagram illustrating a program policy descriptor for setting a policy level of a real-time event. As shown in FIG. 13, the program policy descriptor (program_policy_descriptor) includes information, such as: a tag indicating that this information is the policy level (description_tag); a length of the description of the policy level (descriptor_length); and the policy level (policy_level). The program policy descriptor is described in a first descriptor region included in the PMT associated with a program event. The policy level setting unit 132 of the receiving device 2b sets the policy level of a real-time event to the program policy descriptor.

FIG. 14 is a diagram illustrating a data structure of an event security policy. As shown in FIG. 14, the event security policy includes a relationship among an application ID, a control code, a priority, a protocol identifier, and a program related flag. The protocol identifier indicates whether each application is transmitted by broadcasting or communication.

FIG. 15 is a diagram illustrating an event security descriptor for setting an event security policy. As shown in FIG. 15, the event security descriptor (event_security_descriptor) includes: a tag indicating that this information is a description of the policy level of a program event (description_tag); and a length of the description of the policy level (descriptor_length). The event security policy further includes a set of an application ID (application_identifier), a control code (application_control_code), a priority (application_priority), and a protocol identifier (protocol_id). The event security policy descriptor is described in a descriptor region included in the EIT associated with a program event. Here, the event security policy descriptor can be set with a program policy level (policy_level) of a program event. The event security policy setting unit 135 of the receiving device 2b sets an event security policy to the event security policy descriptor.

Figure 16:
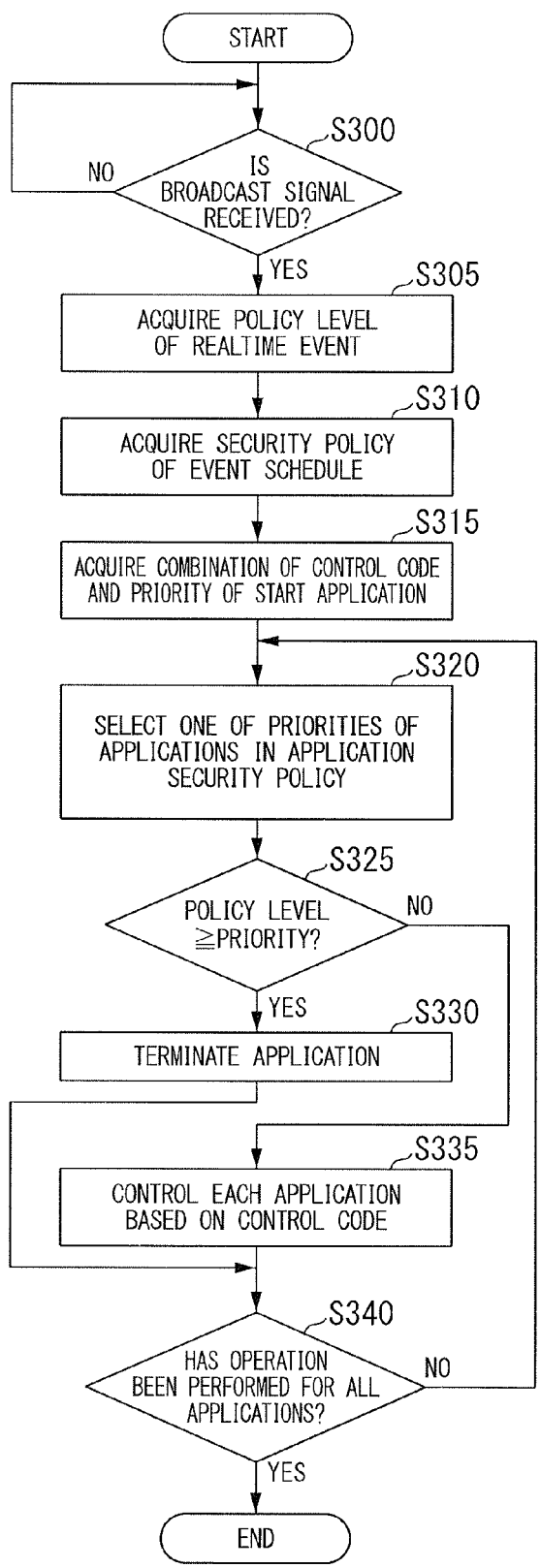
FIG. 16 is a flowchart illustrating process flow for a receiving device of the third embodiment.

FIG. 16 is process flow for the receiving device 2b according to the third embodiment.

The application policy management device 11b stores: an event ID of a program event; an application ID of an application to be controlled; a control code; a priority; a protocol identifier; and a program related flag. Additionally, the structure information management device 14 stores structure information. A broadcasting organization timely updates, as needed, the information stored by the application policy management device 11b and the structure information management device 14.

The event security policy setting unit 135 of the broadcast sending device 13b refers to the broadcast time of the structure information stored by the structure information management device 14. Then, the event security policy setting unit 135 specifies a predetermined number of program events to be broadcast hereafter, and reads the event ID and the broadcast time of each of the specified program events. The event security policy setting unit 135 reads from the application policy management device 11b, an application ID, a control code, a priority, a protocol identifier, and a program related flag, which are associated with the read event ID. The event security policy setting unit 135 sets to a broadcast signal, an event security policy including those read informations, and sets the broadcast time of the program event to the broadcast signal.

Additionally, similar to the first embodiment, the policy level setting device 12 stores the policy level of the real-time event, the broadcasting organization timely rewrites, as needed, the information stored by the policy level setting device 12. The policy level setting unit 132 of the broadcast sending device 13b reads the policy level of the real-time event stored by the policy level setting device 12, and sets the read policy level to the broadcast signal.

The broadcast sending unit 133 sends the broadcast signal to which the event security policy setting unit 135 sets the event security policy and the broadcast time, and the policy level setting unit 132 sets the policy level.

The broadcast receiving unit 21 of the receiving device 2b receives the broadcast signal broadcast from the broadcast sending device 13b, demodulates the received broadcast signal, and outputs the demodulated broadcast signal to the application control determining unit 23b. The policy level acquiring unit 231 of the application control determining unit 23b acquires the policy level of the real-time event from the PMT in the demodulated broadcast signal (step S305). The event security policy acquiring unit 236 acquires from the EIT in the demodulated broadcast signal, the event ID and the broadcast time of each program event, and the event security policy associated with the event ID, and writes the acquired informations in the storage unit 24 (step S310).

The determining unit 233b refers to the broadcast time stored in the storage unit 24, and specifies a program event on the air. Then, the determining unit 233b acquires from the application security policy, the application ID, the control code, and the priority, which are associated with the event ID of the specified program event (step S315).

The application control determining unit 23b performs similar processes to those in steps S115 to S135 shown in FIG. 5 (step S320 to step S340). However, the process by the determining unit 233 of the first embodiment is performed by the determining unit 233b. Additionally, the application ID, the control code, and the priority, which are acquired in step S110, are assumed to be the application ID, the control code, and the priority, which are acquired by the determining unit 233b in step S315.

As explained above, the receiving device 2b acquires the policy level at the current time from the PMT in the received broadcast signal. Then, the receiving device 2b acquires from the EIT in the broadcast signal, the application ID, the control code, the priority, and the like for each program event. The receiving device 2b compares the priority of each application acquired from the EIT and the policy level received from the PMT. For example, the receiving device 2b controls, in accordance with the control code, an application with the priority that is higher than or equal to the policy level. The receiving device 2b terminates the application in a case where an application with the priority that is lower than the policy level is running, and executes no operation in a case where such an application is not running.

Here, in step S335, the display control unit 271 may determine the layout of a broadcast window and an application window based on the protocol identifier set to the event security descriptor in association with the application ID. For example, in a case where the protocol identifier indicates transmission by broadcasting, the display control unit 271 determines the layout such that the application window is overlay-displayed on the broadcast window. In a case where the protocol identifier indicates transmission by communication, the display control unit 271 determines the layout such that the application window is displayed outside the broadcast window.

Additionally, the broadcast sending device 13b may broadcast the program policy level. In a case where the received real-time event is different from the program policy level, the receiving device 2b may determine a higher one of the real-time event and the program policy level to be the current policy level, and then compare the priority of each application. Detailed differences from the operation shown in FIG. 16 are shown hereinafter.

The application policy management device 11b further stores the program policy level of each program event. The event security policy setting unit 135 of the broadcast sending device 13b further reads from the application policy management device 11b, the program policy level associated with the event ID of a program event to be broadcast hereafter, and sets the read program policy level to the broadcast signal.

In step S310, the determining unit 233b further reads the program policy level associated with the event ID of the program event, and writes the read program policy level in the storage unit 24. After the process in step S310, the determining unit 233b refers to the broadcast time stored in the storage unit 24, and specifies the program event on the air. Then, the determining unit 233b reads the program policy level associated with the event ID of the specified program event. In a case where it is determined that the read program policy level is higher than or equal to the policy level of the real-time event acquired by the policy level acquiring unit 231 in step S305, the determining unit 233b determines the program policy level to be the current policy level, and performs the process in step S315. On the other hand, in a case where it is determined that the read program policy level is lower than the policy level of the real-time event, the determining unit 233b determines the policy level of the real-time event to be the current policy level, and performs the process in step S315.

Then, the determining unit 233b compares, in step S325, the current policy level and the priority of the application.

According to the aforementioned embodiment, the broadcasting organization device 1b broadcasts the policy level of the real-time event and the event security policy used as a reference in determining an application to be controlled. Thus, the receiving device 2b can collectively control the applications specified by the broadcasting organization.

4. Fourth Embodiment

Figure 17:
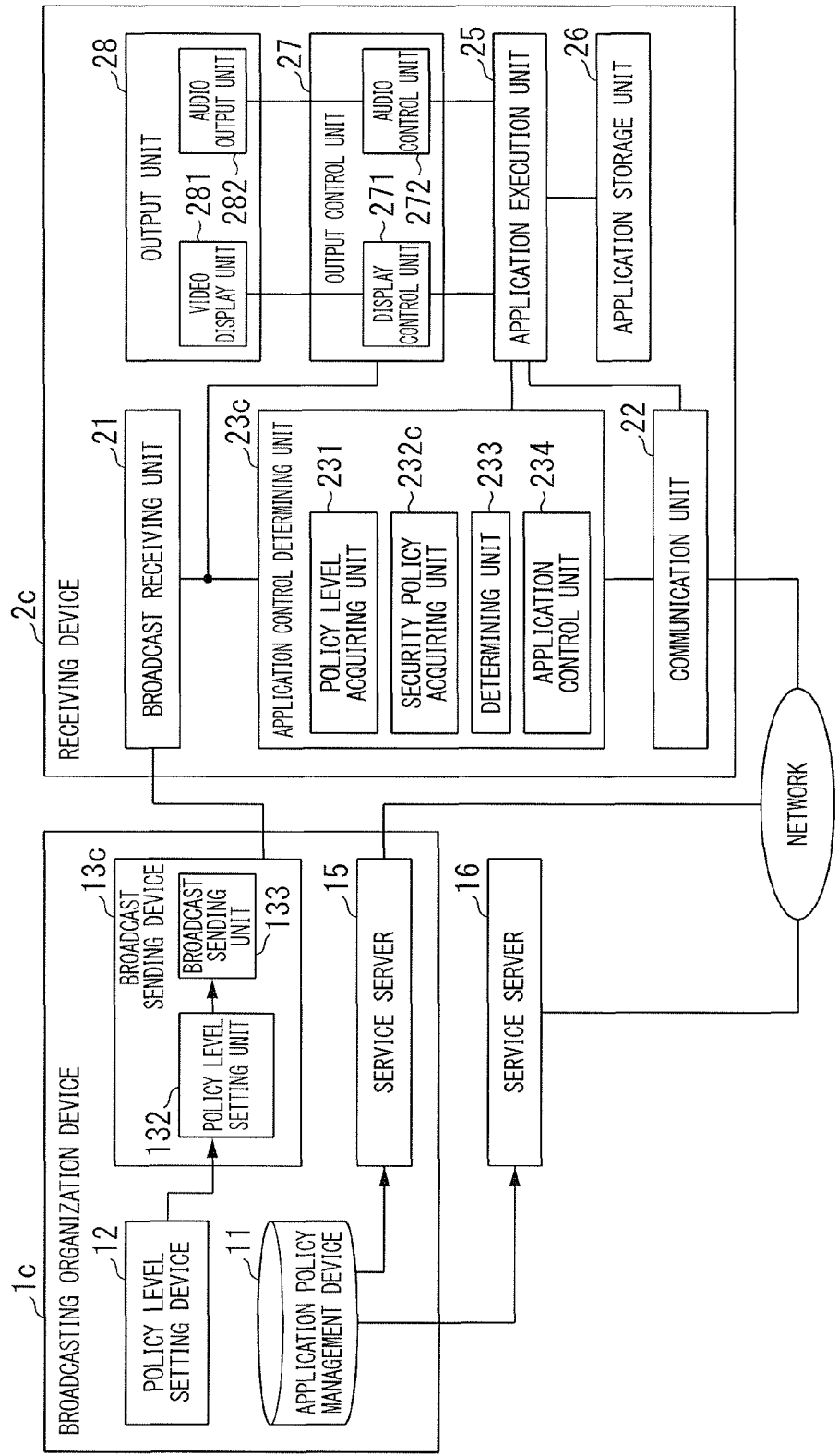
FIG. 17 is a functional block diagram illustrating a broadcasting system according to a fourth embodiment.

FIG. 17 is a functional block diagram illustrating a broadcasting system according to a fourth embodiment of the present invention. In FIG. 17, the same block as included in the broadcasting system of the first embodiment shown in FIG. 1 is appended with the same reference numeral, and an explanation thereof is omitted here. As shown in FIG. 17, the broadcasting system of the fourth embodiment includes: a broadcasting organization device 1c in lieu of the broadcasting organization device 1 of the first embodiment; and a receiving device 2c in lieu of the receiving device 2 of the first embodiment. The broadcasting system of the fourth embodiment further includes a service server 16 owned by an application provider. The application provider is a provider other than a broadcasting organization, and provides applications to be installed in the receiving unit 2c. The broadcasting organization device 1c, the receiving unit 2c, and the service server 16 (sending unit) are connected to a network, such as the Internet.

In the fourth embodiment, the application security policy transmitted by broadcasting in the first embodiment is transmitted by communication. Hereinafter, differences from the first embodiment are mainly explained.

The broadcasting organization device 1c shown in FIG. 17 differs from the broadcasting organization device 1 of the first embodiment shown in FIG. 1 in that the broadcasting organization device 1c includes a broadcast sending device 13c in lieu of the broadcast sending device 13, and further includes a service server 15 (sending unit). The broadcast sending device 13c differs from the broadcast sending device 13 of the first embodiment shown in FIG. 1 in that the broadcast sending device 13c does not include an application policy setting unit 131. The service server 15 is a computer server that manages an application provided by the broadcasting organization. The service server 15 reads from the application policy management device 11, the security polity of the managed application, and stores the read security policy. The service server 15 transmits by communication to the receiving device 2c, an application security policy including the security policy of each application stored.

The service server 16 is a computer server that manages an application provided by the application provider. The service server 16 reads from the application policy management device 11, the security policy associated with the managed application, and stores the read security policy. The service server 16 transmits, by communication to the receiving device 2c, an application security policy of the security policy of each application stored.

The receiving device 2c shown in FIG. 17 differs from the receiving device 2 of the first embodiment shown in FIG. 1 in that the receiving device 2c includes an application control determining unit 23c in lieu of the application control determining unit 23. The application control determining unit 23c differs from the application control determining unit 23 of the first embodiment shown in FIG. 1 in that the application control determining unit 23c includes a security policy acquiring unit 232c in lieu of the security policy acquiring unit 232. The security policy acquiring unit 232c acquires the application security policy from the service server 15 and the service server 16.

FIGS. 18A and 18B are diagrams illustrating examples of descriptions of application security policies transmitted by the service server 15 and the service server 16. The application security policy is described by use of, for example, XML (extensible markup language)-encoding defined in ETSI TS 102 809. As shown in FIG. 18A, a control code of each application is described in application_control_code. Additionally, as shown in FIG. 18B, a relative priority of an application is described in priority included in the application descriptor (ApplicationDescriptor).

Here, a policy level of a real-time event is described in a broadcast signal, similarly to the first embodiment.

Subsequently, operation of the broadcasting system of the present embodiment is explained.

Similar to the first embodiment, the policy level setting device 12 stores a policy level of a real-time event. A broadcasting organization timely rewrites, as needed, the information stored by the policy level setting device 12. The policy level setting unit 132 of the broadcast sending device 13c reads the policy level of the real-time event stored in the policy level setting device 12, and sets the policy level to a broadcast signal. The broadcast sending unit 133 sends the broadcast signal to which the policy level setting unit 132 sets the policy level.

Additionally, similar to the first embodiment, the application policy management device 11 stores a relationship between an application ID and a security policy. The broadcasting organization timely rewrites, as needed, the information stored by the application policy management device 11. The service server 15 reads from the application policy management device 11, the security policy associated with the application ID of the application provided by the broadcasting organization, and stores the read security policy. Additionally, the security server 16 reads from the application policy management device 11, the security policy associated with the application ID of the application provided by the application provider, and stores the read security policy.

The process flow for the receiving device 2c of the fourth embodiment is similar to the process flow for the receiving device 2 of the first embodiment shown in FIG. 5. In step S110, however, the security policy acquiring unit 232c of the receiving device 2c accesses the service server 15 and the service server 16 via the communication unit 22, and reads an application security policy including a set of an application ID, a control code, and a priority of each application.

As explained above, the receiving device 2c acquires the policy level at the current time from the PMT in the received broadcast signal. Then, the receiving device 2c acquires priorities and control codes of all applications at the current time, from the application security policies received from the service server 15 of the broadcasting organization and the service server 16 of the application provider. Then, the receiving device 2c controls, in accordance with the control code, the application with the priority that is higher than or equal to the policy level. With respect to the application with the priority that is lower than the policy level, the receiving device 2c terminates the application in a case where that application is running, and performs no operation in a case where that application is not running.

According to the aforementioned embodiment, it is possible to control a boot or quit of the applications installed in the receiving device 2c as intended by the broadcasting organization, based on the policy level of the real-time event broadcast by the broadcasting organization device 1c and the application security policy that each service server provides by communication.

5. Fifth Embodiment

Figure 19:
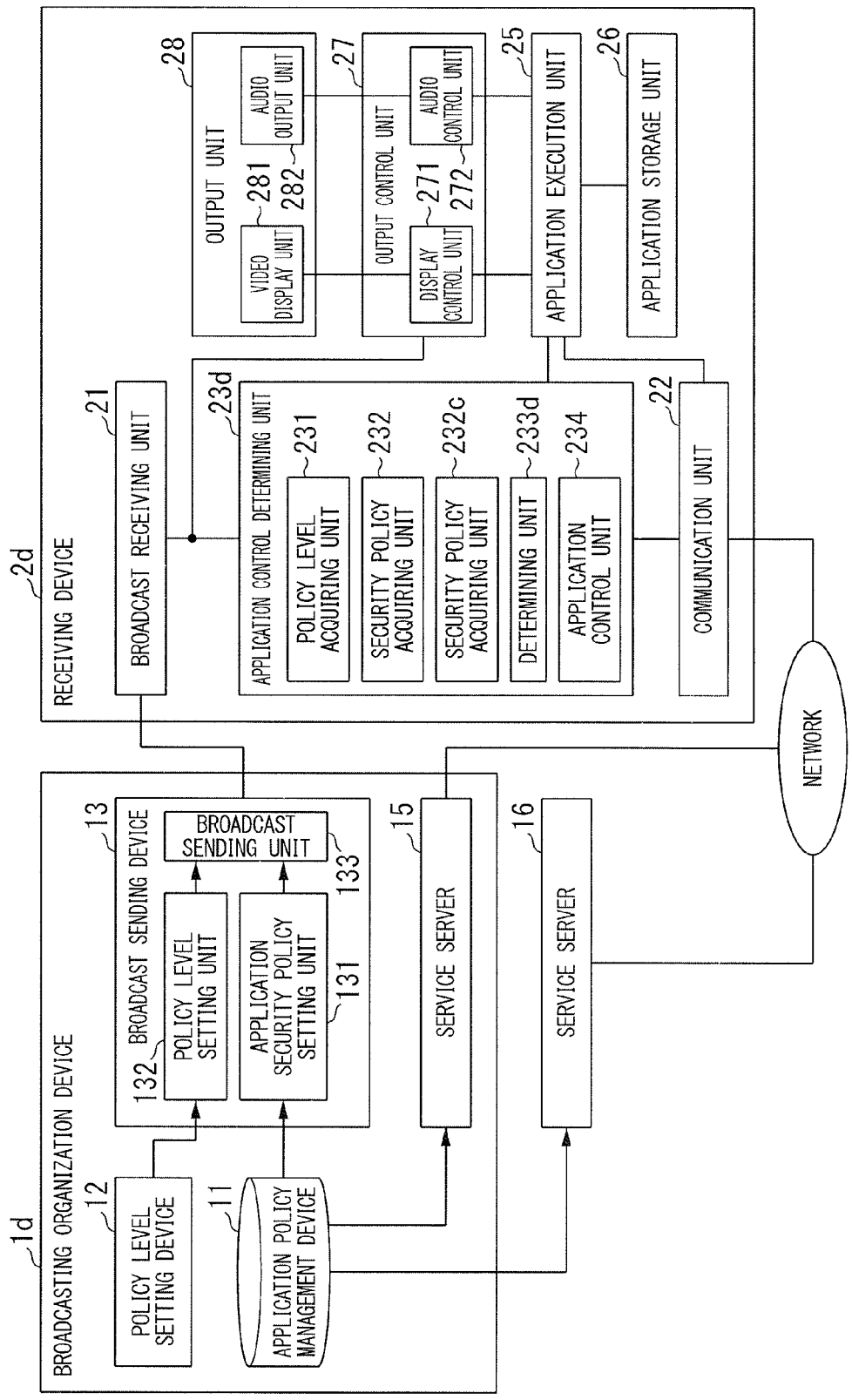
FIG. 19 is a functional block diagram illustrating a broadcasting system according to a fifth embodiment.

FIG. 19 is a functional block diagram illustrating a broadcasting system according to a fifth embodiment of the present invention. In FIG. 19, the same block as included in the broadcasting system of the first embodiment shown in FIG. 1 and the broadcasting system of the fourth embodiment shown in FIG. 17 is appended with the same reference numeral, and an explanation thereof is omitted here. The broadcasting system of the fifth embodiment shown in FIG. 19 includes a broadcasting organization device 1c in lieu of the broadcasting organization device 1c of the fourth embodiment, and a receiving device 2d in lieu of the receiving device 2c of the fourth embodiment.

The fifth embodiment is a combination of the first embodiment and the fourth embodiment. The fourth embodiment is not suitable to a real-time update of information since the application security policies are transmitted by communication from the service server 15 and the service server 16. For this reason, in the fifth embodiment, similar to the first embodiment, the application security policy is transmitted by broadcasting also from the broadcast sending device 13. Hereinafter, differences from the fourth embodiment are mainly explained.

The broadcasting organization device 1d shown in FIG. 19 differs from the broadcasting organization device 1c of the fourth embodiment shown in FIG. 17 in that the broadcasting organization device 1d includes the broadcast sending device 13 of the first embodiment shown in FIG. 1 in lieu of the broadcast sending device 13c.

Additionally, the receiving device 2d shown in FIG. 19 differs from the receiving device 2c of the fourth embodiment shown in FIG. 17 in that the receiving device 2d includes an application control determining unit 23d in lieu of the application control determining unit 23c. The application control determining unit 23d differs from the application control determining unit 23c of the fourth embodiment in that the application control determining unit 23d includes: a security policy acquiring unit 232 of the first embodiment shown in FIG. 1; and a determining unit 233d in lieu of the determining unit 233.

The determining unit 233d compares the application security policy that the security policy acquiring unit 232 has received from the broadcast signal and the application security policy that the security policy acquiring unit 232c has received by communication. In a case where those two application security policies are different, the determining unit 233d selects the application security policy received from the broadcast signal. The determining unit 233d determines an application to be controlled based on the policy level acquired by the policy level acquiring unit 231 and the selected application security policy.

Subsequently, operation of the fifth embodiment is explained.

Similar to the first embodiment, the application security policy setting unit 131 of the broadcast sending device 13 sets to a broadcast signal, the application ID and the security policy which are read from the application policy management device 11. At the same time, the policy level setting unit 132 sets to the broadcast signal, the policy level of the real-time event read from the policy level setting device 12. The broadcast sending unit 133 sends the broadcast signal set with the application security policy and the policy level of the real-time event.

On the other hand, similar to the fourth embodiment, the service server 15 reads from the broadcast sending device 13, the security policy associated with the application ID of the application provided by the broadcasting organization, and stores the read security policy. The security server 16 reads from the application policy management device 11, the security policy associated with the application ID of the application provided by the application provider, and stores the read security policy.

Figure 20:
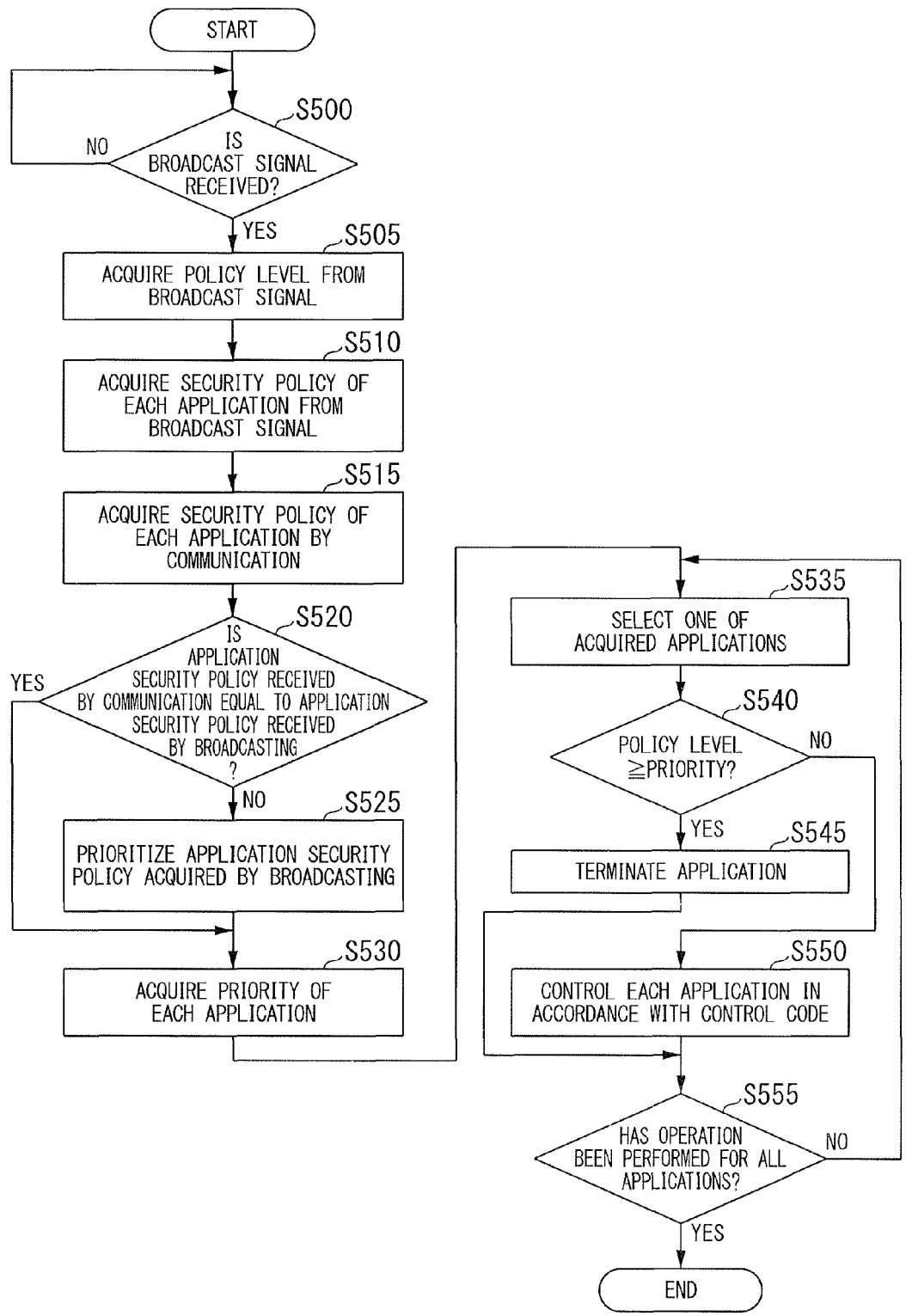
FIG. 20 is a flowchart illustrating process flow for a receiving device according to the fifth embodiment.

FIG. 20 illustrates process flow for the receiving device 2d of the fifth embodiment.

The receiving device 2d performs similar processes to those in steps S100 to S110 of the first embodiment shown in FIG. 5 (steps S500 to S510). In other words, in a case where a broadcast signal is not received, the broadcast receiving unit 21 enters a state of waiting to receive a broad cast signal. On the other hand, in a case where a broadcast signal is received, the broadcast receiving unit 21 demodulates the received broadcast signal and outputs the demodulated broadcast signal to the application control determining unit 23d and the output control unit 27. The policy level acquiring unit 231 of the application control determining unit 23d acquires the policy level of the real-time event from the demodulated broadcast signal. The security policy acquiring unit 232 acquires from the demodulated broadcast signal, an application security policy including a set of an application ID, a control code, and a priority of each application.

Then, the security policy acquiring unit 232c of the receiving device 2d accesses the service server 15 and the service server 16 via the communication unit 22, and reads the application security policy including a set of an application ID, a control code, and a priority of each application (step S515). The determining unit 233d determines whether or not the application security policy received by the security policy acquiring unit 232c (hereinafter referred to as an "application security policy received by communication") is equal to the application security policy received by the security policy acquiring unit 232 in step S510 (hereinafter referred to as an "application security policy received by broadcasting") (step S520). In a case where those two application security policies are equal to each other (step S520: YES), the determining unit 233d sets the application security policy received by communication to be an application security policy to be processed. On the other hand, in a case where those two application security policies are not equal to each other (step S520: NO), the determining unit 233d sets the application security policy received by broadcasting to be an application security policy to be processed (step S525). The determining unit 233d acquires the application ID, the control code, and the priority from the application security policy to be processed (step S530).

The application control determining unit 23d performs similar processes to those in steps S115 to S135 shown in FIG. 5 on the application ID, the control code and the priority, which are acquired in step S530 (steps S535 to S555). However, the process by the determining unit 233 of the first embodiment is performed by the determining unit 233d. Additionally, the application ID, the control code and the priority which are acquired in step S110 are assumed to be the application ID, the control code and the priority which are acquired in step S530 from the application security policy to be processed.

As explained above, in the fifth embodiment, the receiving device 2d controls an application at that time based on the application security policy transmitted by communication from the service server, and the application security policy and the policy level which are broadcast from the broadcasting organization device 1d. In other words, in a case where the security policy for each application differs between the application security policy received by communication and the application security policy received by broadcasting, the receiving device 2d prioritizes the application security policy received by broadcasting over the other. In addition to that, the receiving device 2d compares the policy level of the real-time event and the priority of each application, and thus performs control determination.

6. Sixth Embodiment

Figure 21:
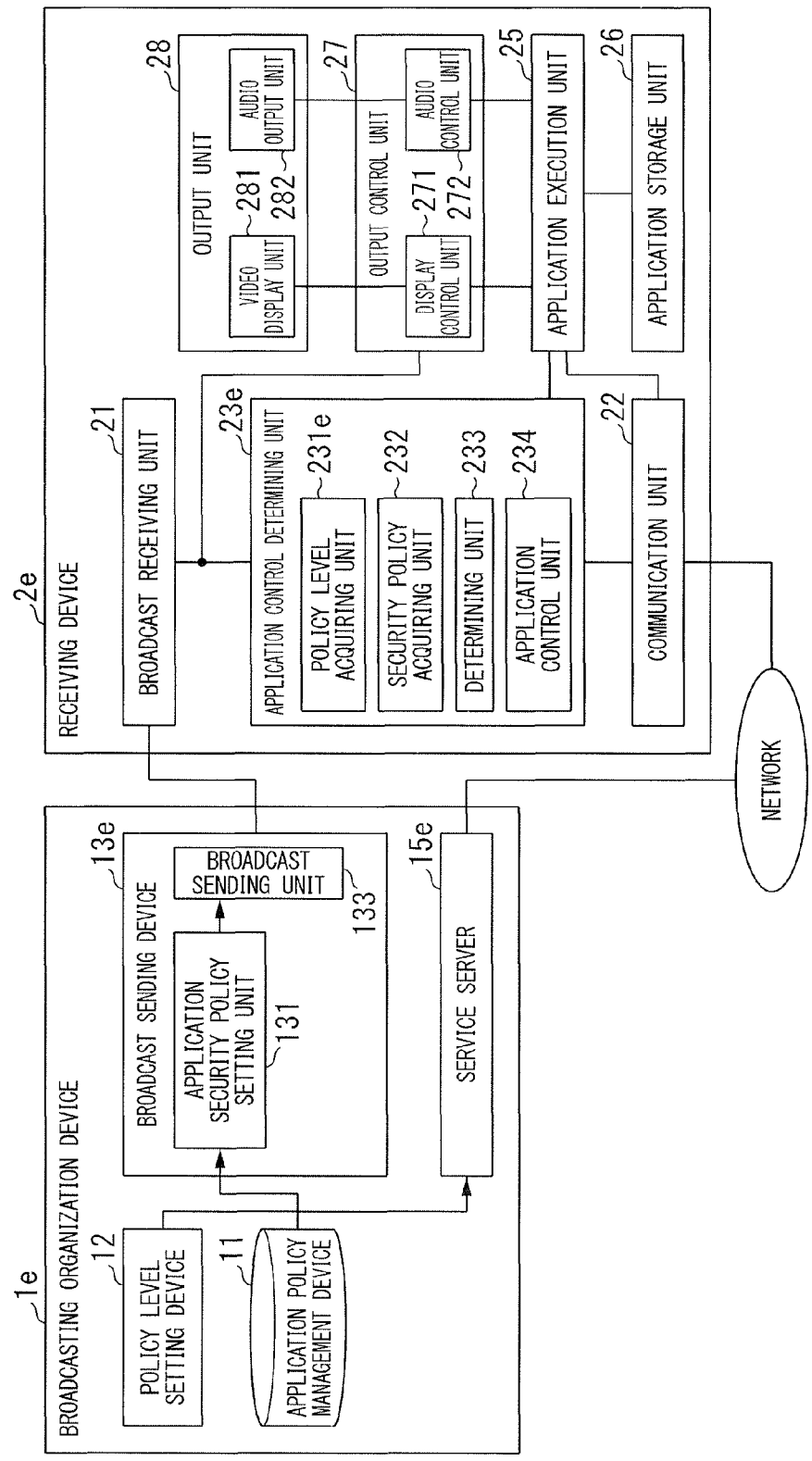
FIG. 21 is a functional block diagram illustrating a broadcasting system according to a sixth embodiment.

FIG. 21 is a functional block diagram illustrating a broadcasting system according to a sixth embodiment of the present invention. In FIG. 21, the same block as included in the broadcasting system of the first embodiment shown in FIG. 1 is appended with the same reference numeral, and an explanation thereof is omitted here. The broadcasting system of the sixth embodiment shown in FIG. 21 includes a broadcasting organization device 1e in lieu of the broadcasting organization device 1 of the first embodiment, and a receiving device 2e in lieu of the receiving device 2 of the first embodiment.

In the sixth embodiment, the policy level, which is transmitted by broadcasting in the first embodiment, is transmitted by communication. Hereinafter, differences from the first embodiment are mainly explained.

The broadcasting organization device 1e shown in FIG. 21 differs from the broadcasting organization device 1 of the first embodiment shown in FIG. 1 in that the broadcasting organization device 1e includes a broadcast sending device 13e in lieu of the broadcast sending device 13, and further includes a service server 15e (sending unit).

The broadcast sending device 13e differs from the broadcast sending device 13 of the first embodiment in that the broadcast sending device 13e does not include a policy level setting unit 132. The service server 15e reads the policy level of the real-time event from the policy level setting device 12, and transmits, by communication, the read policy level to the receiving device 2e. The service server 15e transmits the policy level to the receiving device 2e in real time using, for example, the WebSocket technology.

The receiving device 2e shown in FIG. 21 differs from the receiving device 2 of the first embodiment shown in FIG. 1 in that the receiving device 2e includes an application control determining unit 23e in lieu of the application control determining unit 23. The application control determining unit 23e differs from the application control determining unit 23 of the first embodiment in that the application control determining unit 23e includes a policy level acquiring unit 231e in lieu of the policy level acquiring unit 231. The policy level acquiring unit 231e reads the policy level of the real-time event from the service server 15e.

Next, operation of the broadcasting system of the sixth embodiment is explained.

The application security policy setting unit 131 of the broadcast sending device 13e reads the application ID and the security policy which are stored in the application policy management device 11, and sets the application ID and the security policy to a broadcast signal. The broadcast sending unit 133 sends the broadcast signal to which the application security policy setting unit 131 sets the application security policy. Additionally, the service server 15e reads the policy level stored by the broadcast sending device 13, and stores the read security policy.

The process flow for the receiving device 2e of the sixth embodiment is similar to the process flow for the receiving device 2 of the first embodiment shown in FIG. 5. In step S105, however, the policy level acquiring unit 231e of the receiving device 2e receives the security policy of the real-time event from the service server 15e that accesses the receiving device 2e via the communication unit 22.

7. Seventh Embodiment

Figure 22:
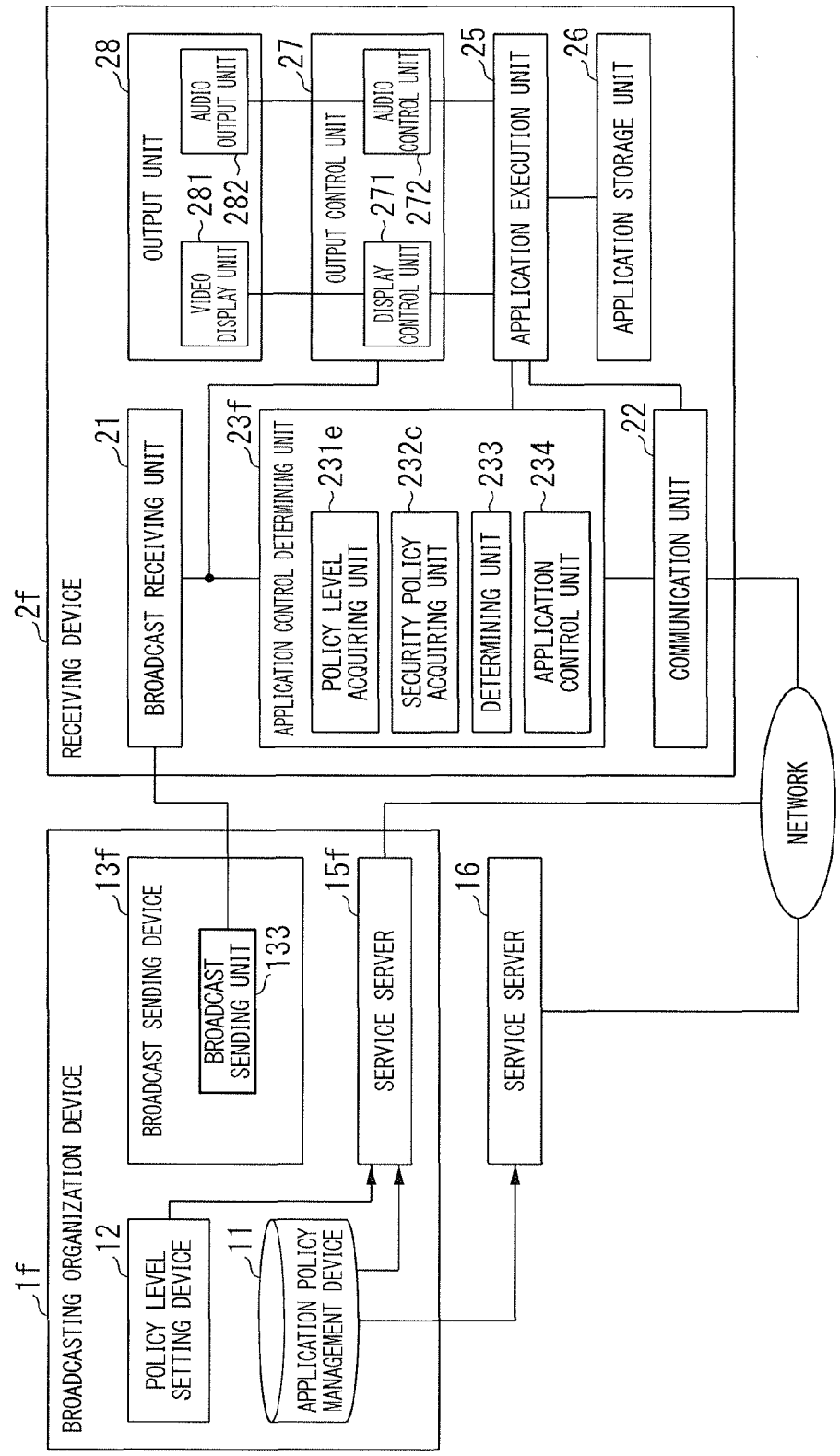
FIG. 22 is a functional block diagram illustrating a broadcasting system according to a seventh embodiment.

FIG. 22 is a functional block diagram illustrating a broadcasting system according to a seventh embodiment of the present invention. In FIG. 22, the same block as included in the broadcasting system of the first embodiment shown in FIG. 1 is appended with the same reference numeral, and an explanation thereof is omitted here. The broadcasting system of the seventh embodiment shown in FIG. 22 includes a broadcasting organization device 1*f* in lieu of the broadcasting organization device 1 of the first embodiment, and a receiving device 2*f* in lieu of the receiving device 2 of the first embodiment. The broadcasting system of the seventh embodiment further includes a service server 16 of the fourth embodiment.

In the seventh embodiment, the policy level and the application security policy, which are transmitted by broadcasting in the first embodiment, are transmitted by communication. Hereinafter, differences from the first embodiment are mainly explained.

The broadcasting organization device 1*f* shown in FIG. 22 differs from the broadcasting organization device 1 of the first embodiment shown in FIG. 1 in that the broadcasting organization device 1*f* includes the broadcast sending device 13*f* of in lieu of the broadcast sending device 13, and further includes a service server 15*f* (sending unit).

The broadcast sending device 13*f* differs from the broadcast sending device 13 of the first embodiment in that the broadcast sending device 13*f* does not include an application security policy setting and 131 and a policy level setting unit 132. The service server 15*f* manages an application provided by a broadcasting organization. The service server 15*f* reads from the application policy management device 11, the application security policy associated with the managed application, and transmits the read application security polity to the receiving device 2*f* by communication. The service server 15*f* reads the policy level of the real-time event from the policy level setting device 12, and transmits, by communication, the read policy level to the receiving device 2*f*. The service server 15*f* transmits data to the receiving device 2*f* in real time using, for example, the WebSocket technology.

The receiving device 2*f* shown in FIG. 22 differs from the receiving device 2 of the first embodiment shown in FIG. 1 in that the receiving device 2*f* includes an application control determining unit 23*f* in lieu of the application control determining unit 23. The application control determining unit 23*f* differs from the application control determining unit 23 in that the application control determining unit 23*f* includes: the policy level acquiring unit 231*e* of the sixth embodiment in lieu of the policy level acquiring unit 231; and the security policy acquiring unit 232*c* of the fourth embodiment in lieu of the security policy acquiring unit 232.

Next, operation of the broadcasting system of the seventh embodiment is explained.

The service server 15*f* reads from the broadcast sending device 13, the security policy associated with the application ID of the application provided by the broadcasting organization, and stores the read security policy. Further, the service server 15*f* reads the policy level of the real-time event stored by the policy level setting device 12, and stores the read policy level.

On the other hand, the security server 16 reads from the application policy management device 11, the security policy associated with the application ID of the application provided by the application provider, and stores the read security policy.

The process flow for the receiving device 2*f* of the seventh embodiment is similar to the process flow for the receiving device 2 of the first embodiment shown in FIG. 5. In step S105, however, the policy level acquiring unit 231*e* of the receiving device 2*f* receives the security policy of the real-time event from the service server 15*f* that accesses the receiving device 2*f* via the communication unit 22. In step S110, the security policy acquiring unit 232*c* of the receiving device 2*f* accesses the service server 15*f* and the service server 16 via the communication unit 22, and reads an application security policy including a set of an application ID, a control code, and a priority of each application.

According to the seventh embodiment, the service server transmits, by communication, the policy level of the real-time event and the security policy. Therefore, it is possible for the broadcasting organization to control a boot or quit of the applications installed in the receiving device without adding any change to the broadcast sending device of the broadcasting organization.

8. Eighth Embodiment

Figure 23:
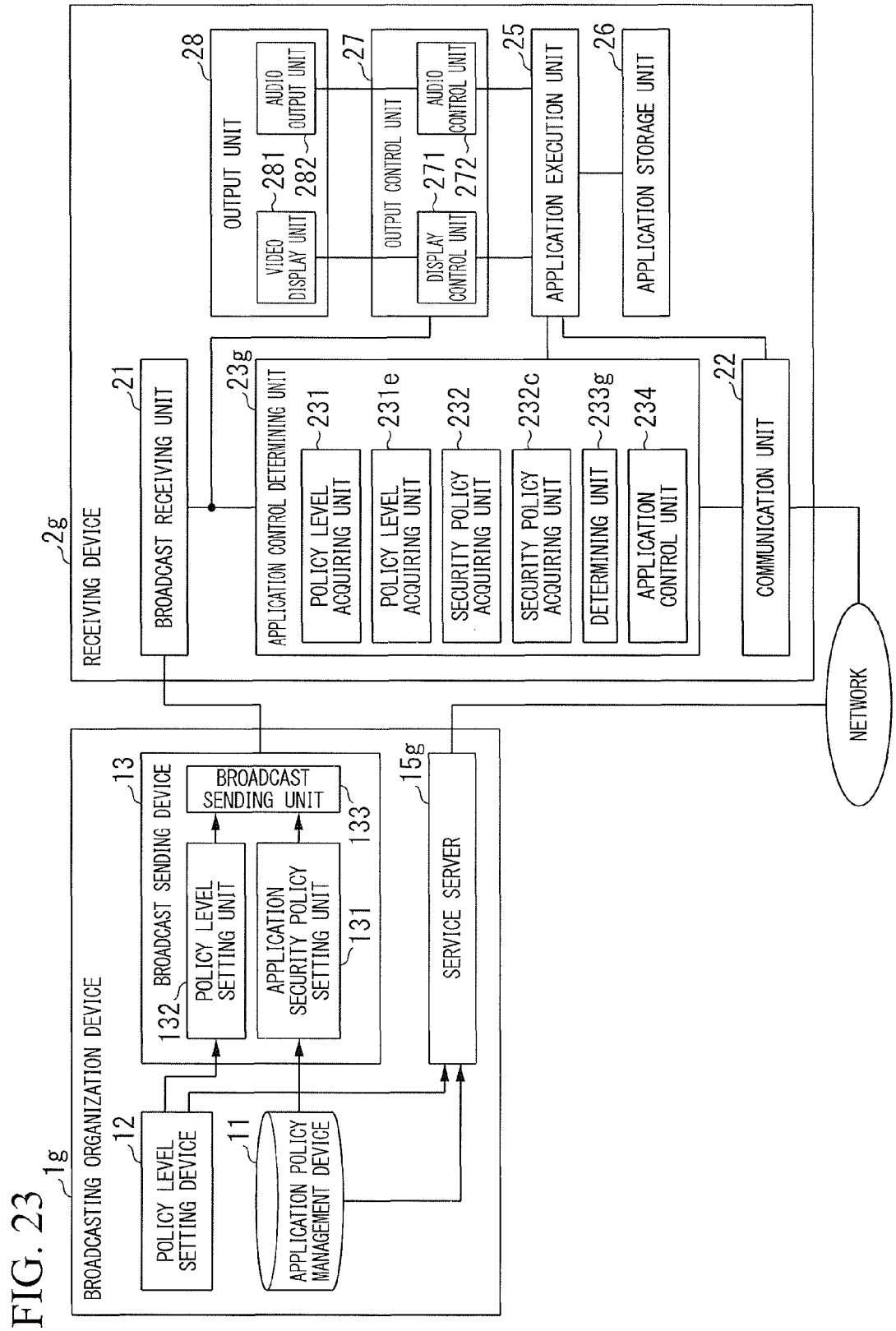
FIG. 23 is a functional block diagram illustrating a broadcasting system according to an eighth embodiment.

FIG. 23 is a functional block diagram illustrating a broadcasting system according to an eighth embodiment of the present invention. In FIG. 23, the same block as included in the broadcasting system of the first embodiment shown in FIG. 1 is appended with the same reference numeral, and an explanation thereof is omitted here. The broadcasting system of the eighth embodiment shown in FIG. 23 includes a broadcasting organization device 1*g* in lieu of the broadcasting organization device 1 of the first embodiment shown in FIG. 1, and a receiving device 2*g* in lieu of the receiving device 2 of the first embodiment.

In the eighth embodiment, whether to transmit each of the policy level of the real-time event and the application security policy by broadcasting or by communication is timely changed. Hereinafter, differences from the first embodiment are mainly explained.

The broadcasting organization device 1*g* shown in FIG. 23 differs from the broadcasting organization device 1 of the first embodiment shown in FIG. 1 in that the broadcasting organization device 1*g* further includes a service server 15*g* (sending unit, data communication unit). The service server 15*g* reads the policy level of the real-time event from the policy level setting device 12, and transmits, by communication, the read policy level to the receiving device 2*g*. Additionally, the service server 15*g* reads the application security policy from the application policy management device 11, and transmits, by communication, the read application security policy to the receiving device 2*g*.

The receiving device 2*g* shown in FIG. 23 differs from the receiving device 2 of the first embodiment shown in FIG. 1 in that the receiving device 2*g* includes an application control determining unit 23*g* in lieu of the application control determining unit 23. The application control determining unit 23*g* differs from the application control determining unit 23 in that the application control determining unit 23*g* includes the policy level acquiring unit 231*e* and the security policy acquiring unit 232*c*, and includes a determining unit 233*g* in lieu of the determining unit 233.

In the eighth embodiment, the broadcast sending device 13 determines, in accordance with a predetermined condition or an instruction received from the broadcasting organization, whether or not to transmit the policy level of the real-time event by broadcasting, and whether or not to transmit the application security policy by broadcasting.

In a case where it is determined to transmit the application security policy by broadcasting, the application security policy setting unit 131 of the broadcast sending device 13 sets to a broadcast signal, the application security policy read from the application policy management device 11, similarly to the first embodiment. Additionally, in a case where it is determined to transmit the policy level of the real-time event by broadcasting, the policy level setting unit 132 sets to the broadcast signal, the policy level of the real-time event read from the policy level setting device 12, similarly to the first embodiment.

Additionally, the service server 15g determines, in accordance with a predetermined condition or an instruction received from the broadcasting organization, whether or not to transmit the policy level of the real-time event by communication, and whether or not to transmit the application security policy by communication.

In a case where it is determined to transmit the application security policy by communication, the service server 15g transmits to the receiving device 2g via the network, the application security policy read from the application policy management device 11, similarly to the fourth embodiment. Additionally, in a case where it is determined to transmit the policy level of the real-time event by communication, the service server 15g transmits to the receiving device 2g via the network, the policy level of the real-time event read from the policy level setting device 12, similarly to the sixth embodiment.

The process flow for the receiving device 2g of the eighth embodiment is similar to the process flow for the receiving device 2 of the first embodiment shown in FIG. 5. However, in a case where the policy level of the real-time event is set to the broadcast signal in step S105, the policy level acquiring unit 231 of the receiving unit 2g acquires the policy level from the demodulated broadcast signal. In a case where the policy level is to be transmitted by communication, the policy level acquiring unit 231e reads the policy level of the real-time event from the service server 15g.

Additionally, in a case where the application security policy is set to the broadcast signal in step S110, the security policy acquiring unit 232 of the receiving unit 2g acquires the application security policy from the demodulated broadcast signal. In a case where the application security policy is to be transmitted by communication, the security policy acquiring unit 232c acquires the application security policy from the service server 15g.

The determining unit 233g of the receiving unit 2g performs a process similar to that performed by the determining unit 233 of the first embodiment, using the policy level acquired by the policy level acquiring unit 231 and the policy level acquiring unit 231e, and the application security policy acquired by the security policy acquiring unit 232 or the security policy acquiring unit 232c.

Here, similar to the fifth embodiment, the service server 16 of the application provider may be included. The service server 15g of the broadcasting organization reads from the broadcast sending device 13, the security policy associated with the application ID of the application provided by the broadcasting organization, and transmits the read security policy to the receiving device 2g via the network. The security server 16 reads from the application policy management device 11, the security policy associated with the application ID of the application provided by the application provider, and transmits the read security policy to the receiving device 2g via the network.

Additionally, in a case where the application security policy is transmitted both by broadcasting and by communication, the receiving device 2g performs a process similar to that of the fifth embodiment. Further, in a case where the policy level of the real-time event is transmitted both by broadcasting and by communication, the receiving device 2g may prioritize the policy level transmitted by broadcasting.

9. Effects

As explained above, explanations have been given with respect to the embodiments in which the policy level indicating the level of an application to be allowed to be controlled and the security policy level indicating the level of the application are transmitted from the broadcasting organization device to the receiving device while changing a combination of transmission paths, such as broadcasting and communication. The receiving device selects an application to be controlled in accordance with the policy level and the security policy which are received from the broadcasting organization device by broadcasting, communication, and the like, and then performs the instructed control. Thus, it is possible to freely perform, as intended by the broadcasting organization, a control of the applications installed in the receiving device, which includes a control of the state thereof, such as a boot or quit, in accordance with the real-time event to be broadcast from the broadcasting organization device.

Accordingly, the broadcasting organization defines the security policy of an application and sets the defined security policy to the application policy management device, thereby making it possible to perform a control of each application, including a life cycle control of each application, in accordance with the arbitrary level determined by the broadcasting organization side.

In the aforementioned first to third embodiments, information for controlling applications, such as the policy level of the real-time event and the security policy level of each application, is transmitted to the receiving device by means of a broadcast signal. For this reason, even in a case where the policy level of the real-time event is changed, a delay until a control of an application is initiated is short. In interpreting the broadcast signal, the receiving device interprets the PMT first, and then interprets the AIT or EIT specified by the PMT. Therefore, the policy level of the real-time event is set to the PMT as in the first embodiment, thus making it possible for the receiving device to detect a change in the policy level faster. On the other hand, the amount of information that can be set to the PMT is limited. Therefore, the standard is less affected in the second and third embodiments in which information is added to the AIT or EIT, than in the first embodiment.

Additionally, part or all of the information for controlling applications are transmitted by communication to the receiving device as in the fourth, sixth, and seventh embodiments, thereby making it possible to transmit, by communication, information that cannot be transmitted as defined in the standard.

Further, both communication and broadcasting are used as in the fifth embodiment, thereby making it possible to update, in real time, the information for controlling applications that has previously been transmitted by communication.

Moreover, the configuration is made such that the information used for controlling applications can be timely transmitted by communication or broadcasting as in the eighth embodiment, which is effective in such a case where such information transmitting means changes from communication to broadcasting.

10. Others

Here, in the above embodiments, the policy level of the real-time event is transmitted from the broadcasting organization device or the service server. However, the configuration may be made such that the receiving device stores a relationship between the type of real-time event and the policy data, and the policy level acquiring unit reads the policy data associated with the type of the real-time event acquired from the broadcast signal. For example, as the type of real-time event, an event ID of an asynchronous event is used while that asynchronous event is occurring. Additionally, an event ID or genre of a program event is used in a case where no asynchronous event is occurring.

Whether or not an asynchronous event is occurring, and the type of that asynchronous event are indicated by a change in the contents of the broadcast signal in accordance with the start or end of that asynchronous event. For example, in a case where an emergency warning signal occurs, a boot flag for broadcasting an emergency warning of TMCC (transmission and multiplexing configuration and control) changes from "0" to "1". In a case where the emergency warning ends, the boot flag for broadcasting the emergency warning changes from "1" to "0". Additionally, in a case where an earthquake emergency warning occurs, binary data that is the text of "earthquake emergency warning" appears at data_group_data_byte in the data group of caption data transmitted by an independent PES (packetized elementary stream) system. In a case where the earthquake emergency warning ends, the binary data disappears.

Additionally, the genre of program event can be acquired from content_nibble_level_1 and content_nibble_level_2 which are defined in the content descriptor of the EIT.

FIG. 24 is a diagram illustrating another example of a description of an event security descriptor in a broadcast signal. In the example of the description of the event security descriptor shown in FIG. 24, information concerning a location of an application and parameters at the time when the application is booted is described in addition to the example of the description shown in FIG. 15.

In FIG. 24, the character string "location_byte" is a character string indicating the information concerning the location of the application. The information concerning the location of the application is information indicating a location at which an execution file (code) of the application is recorded. The location information may be, for example, a URL (uniform resource locator) indicating an execution file, information indicating an IP address of a device storing the execution file and a path of the execution file, or information in another format.

In FIG. 24, the character string "parameter byte" is a character string representing a parameter given to an application at the time when an application is booted.

The event security descriptor of the broadcast signal is described as shown in FIG. 24, thereby making it possible to describe, in the event security descriptor, the information concerning the location of the application and the parameter at the time when the application is booted, and communicate those informations to the receiving device.

FIG. 25 is a diagram illustrating another example of a description of an event security descriptor in a broadcast signal. Also in the example of the description of the event security descriptor shown in FIG. 25, similar to the example of the description of the event security descriptor shown in FIG. 24, information concerning a location of an application and parameters at the time when the application is booted are described. Specifically, in FIG. 25, a region of Application_descriptors ("descriptor( )") is added to the example of the description shown in FIG. 15. In the region of Application_descriptors, information corresponding to an ARIB-J application location descriptor and an ARIB-J application location descriptor which are defined in B23 are described.

The event security descriptor of a broadcast signal is described as shown in FIG. 25, thereby making it possible to describe the information concerning the location of the application and the parameter at the time when the application is booted are described in the event security descriptor, and communicate those to the receiving device, similarly to the case where the event security descriptor is described as shown in FIG. 24.

FIG. 26A is a diagram illustrating another example of a description of an event security descriptor in a broadcast signal. FIG. 26B is a diagram illustrating a portion of the example of the description shown in FIG. 24, which is deleted in FIG. 26A. An event security descriptor in a broadcast signal may be described as shown in FIG. 26A. In this case, the described portion shown in FIG. 26B may be described in the AIT.

Even in a case where the event security descriptor in the broadcast signal is described as shown in FIG. 26A, as long as the descripted portion shown in FIG. 26B is described in the AIT, it is possible to communicate to the receiving device, the information concerning the location of the application and the parameter at the time when the application is booted, similarly to the cases shown in FIGS. 24 and 25.

A computer system is included in each of the aforementioned application policy management device 11, the application policy management device 11a, the application policy management device 11b, the policy level setting device 12, the broadcast sending device 13, the broadcast sending device 13a, the broadcast sending device 13b, the broadcast sending device 13c, the broadcast sending device 13e, the broadcast sending device 13f, the structure information management device 14, the receiving device 2, the receiving device 2a, the receiving device 2b, the receiving device 2c, the receiving device 2e, the receiving device 2d, the receiving device 2f, the receiving device 2g, the service server 15, the service server 15e, the service server 15f, the service server 15g, and the service server 16.

Additionally, a computer-readable recording medium stores, in program format, operational steps to be performed by: the application policy management device 11; the application policy management device 11a; the application policy management device 11b; the policy level setting device 12; the application security policy setting unit 131 and the policy level setting unit 132 of the broadcast sending device 13; the application security policy setting unit 131, the policy level setting unit 132, and the event schedule security policy setting unit 134 of the broadcast sending device 13a; the policy level setting unit 132 and the event security policy setting unit 135 of the broadcast sending device 13b; the policy level setting unit 132 of the broadcast sending device 13c; the application security policy setting unit 131 of the broadcast sending device 13e; the structure information management device 14; the application control determining unit 23, the application execution unit 25, and the output control unit 27 of the receiving device 2; the application control determining unit 23a, the application execution unit 25, and the output control unit 27 of the receiving device 2a; the application control determining unit 23b, the application execution unit 25, and the output control unit 27 of the receiving device 2b; the application control determining unit 23c, the application execution unit 25, and the output control unit 27 of the receiving device 2c; the application control determining unit 23d, the application execution unit 25, and the output control unit 27 of the receiving device 2d; the application control determining unit 23e, the application execution unit 25, and the output control unit 27 of the receiving device 2e; the application control determining unit 23f, the application execution unit 25, and the output control unit 27 of the receiving device 2f; the application control determining unit 23g, the application execution unit 25, and the output control unit 27 of the receiving device 2g; the service server 15; the service server 15e; the service server 15f; the service server 15g; and the service server 16. Then, a computer system reads and executes the program, thereby performing the above processes. Here, the computer system includes a CPU, various memories, an OS, and hardware such as a peripheral equipment.

Further, the "computer system" includes home page provision environments (or display environments) in a case where a WWW system is used.

Moreover, the "computer-readable recording medium" refers to a storage unit such as portable media like a flexible disk, a magneto-optical disk, a ROM, or a CD-ROM, and a hard disk built in the computer system. Additionally, the "computer-readable recording medium" may also include: a medium which stores a program dynamically and temporarily, such as a communication line when the program is transmitted via a network such as the Internet or a communication line such as a telephone line; and a medium which stores the program for a certain period of time, such as a volatile memory included in a computer system functioning as a server and a client in that case. Further, the aforementioned program may be a program which implements part of the aforementioned functions, or a program which may implement the aforementioned functions in combination of another program already stored in the computer system.

INDUSTRIAL APPLICABILITY

The present invention is applicable to a purpose of controlling an application installed in a broadcast receiving device in accordance with content on the air, and the like.

DESCRIPTION OF REFERENCE NUMERALS 1, 1a, 1b, 1c, 1d, 1e, 1f, 1g: broadcasting organization device (transmitting device)
11, 11a, 11b: application policy management device
12: policy level setting device
13, 13a, 13b, 13c, 13e, 13f: broadcast sending device
131: application security policy setting unit
132: policy level setting unit
133: broadcast sending unit (sending unit)
134: event schedule security policy setting unit
135: event security policy setting unit
14: structure information management device
15, 15e, 15f, 15g, 16: service server (sending unit, data communication unit)
2, 2a, 2b, 2c, 2e, 2d, 2f, 2g: receiving device
21: broadcast receiving unit
22: communication unit
23, 23a, 23b, 23c, 23d, 23e, 23f, 23g: application control determining unit
231, 231e: policy level acquiring unit
232, 232c: security policy acquiring unit
233, 233a, 233b, 233d, 233g: determining unit
234: application control unit
235: policy management unit
236: event security policy acquiring unit
24, 24b: storage unit
25: application execution unit
26: application storage unit
27: output control unit
271: display control unit
272: audio control unit
28: output unit
281: video display unit
282: audio output unit

The invention claimed is:

1. A receiving device comprising:
an output unit configured to output content broadcast from a transmitting device;
an application execution unit configured to execute an application;
a security policy acquiring unit configured to acquire security policy level data sent from the transmitting device with respect to the application, the security policy level data indicating a priority level of the application;
a policy level acquiring unit configured to acquire policy level data sent from the transmitting device with respect to currently broadcast content, the policy level data indicating a priority level of the currently broadcast content;
a determining unit configured to determine whether or not the application is an application to be controlled by comparing the priority level of the currently broadcast content indicated by the policy level data and the priority level of the application indicated by the security policy data; and
an application control unit configured to instruct the application execution unit to control the application determined to be the application to be controlled.

2. The receiving device according to claim 1, wherein the policy level acquiring unit is configured to acquire a relationship between a broadcast schedule of content and the security policy level data of the application, the relationship being transmitted from the transmitting device, and
the determining unit is configured to determine whether or not the application is the application to be controlled based on the policy level data of the currently broadcast content acquired by the policy level acquiring unit and the security policy level data of the application read from the storage unit in association with the currently broadcast content.

3. The receiving device according to claim 2, further comprising:
a policy management unit configured to acquire a broadcast schedule of content and the policy level of the content which are transmitted from the transmitting device, and write the broadcast schedule and the policy level in a storage unit,
wherein the determining unit is configured to determine current policy level data based on the policy level date of the currently broadcast content acquired by the policy level acquiring unit and the policy level data read from the storage unit in association with the currently broadcast content, and determine whether or not the application is the application to be controlled based on the current policy level data determined and the security policy level data of the application.

4. A transmitting device comprising:
a broadcast sending unit configured to broadcast a broadcast signal to which content is set; and
a data communication unit configured to transmit data by communication,
wherein security policy level data indicating a priority level of an application to be executed by a receiving device configured to receive the broadcast signal is broadcast by the broadcast sending unit using the broadcast signal, or is transmitted by the data communication unit executing communication, policy level data indicating a priority level of currently broadcast content is broadcast by the broadcast sending unit using the broadcast signal or is transmitted by the data communication unit executing communication, and the priority level of the currently broadcast content indicated by the policy level data and the priority level of the application indicated by the security policy data are to be compared by the receiving device to determine whether or not the application is an application to be controlled.

5. A broadcasting system comprising:

a transmitting device configured to broadcast content; and a receiving device configured to receive and output the content broadcast, wherein the transmitting device comprises:

a sending unit configured to send security policy level data indicating a priority level of an application, and policy level data indicating a priority level of currently broadcast content, and the receiving device comprises:

an application execution unit configured to execute an application;

a security policy acquiring unit configured to acquire the security policy level data sent from the transmitting device with respect to the application;

a policy level acquiring unit configured to acquire the policy level data sent from the transmitting device with respect to the currently broadcast content;

a determining unit configured to determine whether or not the application is an application to be controlled by comparing the priority level of the currently broadcast content indicated by the policy level data and the priority level of the application indicated by the security policy data; and an application control unit configured to instruct the application execution unit to control the application determined to be the application to be controlled.

6. A non-transitory computer-readable recording medium storing program to be executed by a computer of a receiving device to perform:

outputting content broadcast from a transmitting device;

executing an application;

acquiring security policy level data sent from the transmitting device with respect to the application, the security policy level data indicating a priority level of the application;

acquiring policy level data sent from the transmitting device with respect to currently broadcast content, the policy level data indicating a priority level of the currently broadcast content;

determining whether or not the application is an application to be controlled by comparing the priority level of the currently broadcast content indicated by the policy level data and the priority level of the application indicated by the security policy data of the application; and controlling the application the application determined to be controlled.

7. A receiving method comprising:

outputting content broadcast from a transmitting device;

executing an application;

acquiring security policy level data sent from the transmitting device with respect to the application, the security policy level data indicating a priority level of the application;

acquiring policy level data sent from the transmitting device with respect to currently broadcast content, the policy level data indicating a priority level of the currently broadcast content;

determining whether or not the application is an application to be controlled by comparing the priority level of the currently broadcast content indicated by the policy level data and the priority level of the application indicated by the security policy data of the application acquired; and controlling the application determined to be controlled.

* * * * *